United States Patent
Dou et al.

(10) Patent No.: US 11,496,946 B2
(45) Date of Patent: Nov. 8, 2022

(54) TRANSMISSION PATH SWITCHING METHOD AND APPARATUS

(71) Applicant: Huawei Technologies Co., Ltd., Shenzhen (CN)

(72) Inventors: Fenghui Dou, Beijing (CN); Chaofeng Lian, Beijing (CN); Kai Yuan, Beijing (CN); Yue He, Beijing (CN); Hui Jin, Beijing (CN); Yongbo Zeng, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/972,992

(22) PCT Filed: Jun. 10, 2019

(86) PCT No.: PCT/CN2019/090584
§ 371 (c)(1),
(2) Date: Dec. 7, 2020

(87) PCT Pub. No.: WO2019/233492
PCT Pub. Date: Dec. 12, 2019

(65) Prior Publication Data
US 2021/0235360 A1 Jul. 29, 2021

(30) Foreign Application Priority Data

Jun. 7, 2018 (CN) .......................... 201810582246.2
Nov. 1, 2018 (CN) .......................... 201811293648.7
Apr. 25, 2019 (CN) .......................... 201910341048.1

(51) Int. Cl.
H04W 40/12 (2009.01)
H04W 12/06 (2021.01)
(Continued)

(52) U.S. Cl.
CPC ........... *H04W 40/12* (2013.01); *H04W 12/06* (2013.01); *H04W 40/04* (2013.01);
(Continued)

(58) Field of Classification Search
None
See application file for complete search history.

(56) References Cited

U.S. PATENT DOCUMENTS 9,137,701 B2 * 9/2015 Raleigh ............. H04M 15/8055
9,967,742 B1 * 5/2018 Belton, Jr ........... H04W 12/069
(Continued)

FOREIGN PATENT DOCUMENTS

CN 102655664 A 9/2012
CN 106576395 A 4/2017
(Continued)

OTHER PUBLICATIONS

"3rd Generation Partnership Project; Technical Specification Group Services and System Aspects; System Architecture for the 5G System; Stage 2 (Release 15)," 3GPP TS 23.501 V15.2.0, pp. 1-217, 3rd Generation Partnership Project, Valbonne, France (Jun. 2018).
(Continued)

Primary Examiner — Brian S Roberts
(74) Attorney, Agent, or Firm — Leydig, Voit & Mayer, Ltd.

(57) ABSTRACT

Embodiments of this application provide a transmission path switching method and apparatus. When a transmission path is switched, a currently used data transmission path is not directly switched from a first transmission path to a second transmission path after the second transmission path is configured, but after it is further determined that a first condition is met, the currently used data transmission path is switched from the first transmission path to the second transmission path, to avoid data interruption in a process of
(Continued)

switching a data transmission path of an application from the first transmission path to the second transmission path. This improves use smoothness of the application.

9 Claims, 13 Drawing Sheets

(51) Int. Cl.
H04W 40/04 (2009.01)
H04W 40/24 (2009.01)
H04W 80/06 (2009.01)
H04W 84/12 (2009.01)

(52) U.S. Cl.
CPC ......... *H04W 40/248* (2013.01); *H04W 80/06* (2013.01); *H04W 84/12* (2013.01)

(56) References Cited

U.S. PATENT DOCUMENTS

| | | | | |
|---|---|---|---|---|
| 2007/0025342 A1* | 2/2007 | Obata | ................. | H04L 69/28 |
| | | | | 370/352 |
| 2012/0315905 A1* | 12/2012 | Zhu | ................. | H04W 36/36 |
| | | | | 455/436 |
| 2013/0040693 A1* | 2/2013 | Chen | ................. | H04W 36/14 |
| | | | | 455/525 |
| 2013/0336287 A1* | 12/2013 | Abraham | .......... | H04W 36/0066 |
| | | | | 370/331 |
| 2016/0183129 A1 | 6/2016 | LIU et al. | | |
| 2016/0302064 A1 | 10/2016 | Tsai et al. | | |
| 2016/0345341 A1 | 11/2016 | Oliver et al. | | |
| 2017/0289885 A1 | 10/2017 | Kaushik | | |
| 2020/0137653 A1* | 4/2020 | Park | ................. | H04W 36/30 |

FOREIGN PATENT DOCUMENTS

| | | |
|---|---|---|
| CN | 206149269 U | 5/2017 |
| CN | 107135525 A | 9/2017 |
| CN | 107306432 A | 10/2017 |

OTHER PUBLICATIONS

"3rd Generation Partnership Project; Technical Specification Group Services and System Aspects; Procedures for the 5G System; Stage 2 (Release 15)," 3GPP TS 23.502 V15.2.0, pp. 1-308, 3rd Generation Partnership Project, Valbonne, France (Jun. 2018).

* cited by examiner

TRANSMISSION PATH SWITCHING METHOD AND APPARATUS

This application is a national stage of International Application No. PCT/CN2019/090584, filed on Jun. 10, 2019, which claims priority to Chinese Patent Application No. 201810582246.2, filed on Jun. 7, 2018 and Chinese Patent Application No. 201811293648.7, filed on Nov. 1, 2018 and Chinese Patent Application No. 201910341048.1, filed on Apr. 25, 2019. All of the aforementioned applications are hereby incorporated by reference in their entireties.

TECHNICAL FIELD

This application relates to the field of communications technologies, and in particular, to a transmission path switching method and apparatus.

BACKGROUND

Wireless-fidelity (Wi-Fi) is a wireless network transmission technology that can connect terminals such as a personal computer and a handheld device (for example, a mobile phone or an iPad) to a network in a wireless manner. After accessing a Wi-Fi network from a mobile network, a terminal may access the internet by using a fixed network connected to a Wi-Fi access point. In this way, a traffic fee generated when the terminal accesses the internet by using the mobile network can be reduced.

For example, a user plays a game online. In the prior art, when the user plays the game online by using the mobile network, if a Wi-Fi network is detected, the mobile network is automatically switched to the Wi-Fi network, and then the user plays the game online by using the Wi-Fi network. However, when the terminal is switched to the Wi-Fi network, data is interrupted for a relatively long time, and this results in frame freezing in a game playing process. Consequently, use smoothness of an application is poor.

SUMMARY

This application provides a transmission path switching method and apparatus, to improve use smoothness of an application during transmission path switching.

According to a first aspect, an embodiment of this application provides a transmission path switching method, applied to a terminal. A data transmission path currently used by the terminal is a first transmission path corresponding to a mobile network. The transmission path switching method may include:

after the terminal detects a stored wireless fidelity Wi-Fi network, configuring, by the terminal, a second transmission path corresponding to the Wi-Fi network; and if the Wi-Fi network meets a first condition, switching, by the terminal, the currently used data transmission path from the first transmission path to the second transmission path.

The first condition is related to one or more of the following parameters: signal strength of the Wi-Fi network, signal quality of the Wi-Fi network, duration of the signal strength of the Wi-Fi network, duration of the signal quality of the Wi-Fi network, whether the Wi-Fi network requires secondary authentication, whether data can be transmitted by using the second transmission path, and a rate at which data can be transmitted by using the second transmission path.

It can be learned that in this embodiment of this application, when a transmission path is switched, the currently used data transmission path is not directly switched from the first transmission path to the second transmission path after the second transmission path is configured, but after it is further determined that the first condition is met, the currently used data transmission path is switched from the first transmission path to the second transmission path, to avoid data interruption in a process of switching the data transmission path of the application from the first transmission path to the second transmission path. This improves use smoothness of the application.

In an embodiment, the transmission path switching method further includes: determining, by the terminal, whether the Wi-Fi network meets the first condition.

The determining, by the terminal, whether the Wi-Fi network meets the first condition includes:

if an application currently running in the foreground on the terminal is a specific application, determining, by the terminal, whether the Wi-Fi network meets the first condition.

It may be understood that the specific application is an online game application and/or a video live application/or an augmented reality AR related and virtual reality VR related application. Such a specific application has a relatively high requirement on real-time performance, bandwidth, and the like of data transmission, for example, a game application.

In an embodiment, a corresponding first condition when the application currently running in the foreground on the terminal is a non-specific application is different from a corresponding first condition when the application currently running in the foreground on the terminal is a specific application.

In an embodiment, the first condition includes at least one of the following:

the signal strength of the Wi-Fi network is greater than a first threshold; or the signal strength of the Wi-Fi network is greater than the first threshold, and duration in which the signal strength of the Wi-Fi network is greater than the first threshold is greater than a second threshold; or the signal quality of the Wi-Fi network meets a third condition; or the signal quality of the Wi-Fi network meets a third condition, and duration in which the signal quality of the Wi-Fi network meets the third condition is greater than a third threshold; or the Wi-Fi network does not require secondary authentication; or data can be transmitted by using the second transmission path; or data can be transmitted by using second transmission path, and a transmission rate is greater than a fourth threshold.

In an embodiment, a first TCP connection is established between the specific application and a server corresponding to the specific application, and data of the specific application related to first TCP connection is transmitted by using the first transmission path. The switching, by the terminal, the currently used data transmission path from first transmission path to second transmission path may include:

receiving, by a first module of the terminal, indication information from a second module of the terminal, where the indication information is used to switch the currently used data transmission path from the first transmission path to the second transmission path when the terminal determines that a second TCP connection is being established or has been established between the specific application and the corresponding server, where the second TCP connection is different from the first TCP connection; and switching, by the first module of the terminal, the currently used data transmission path from the first transmission path to the second transmission path according to the indication information, so that data of the specific application related to the second TCP connection is transmitted by using the second transmission path.

It may be understood that, in this embodiment of this application, when the second TCP connection is being established between the specific application and the corresponding server may mean when a kernel module receives a TCP connection establishment request sent by a client, and in a specific implementation, may mean when the client invokes a socket interface provided by the kernel module. When a second TCP connection is being established or has been established between the specific application and the corresponding server may be understood as any time point in a time period from a time point at which the second TCP connection starts to be established between the specific application and the corresponding server to a time point at which establishment of the second TCP connection between the specific application and the corresponding server is completed, or to a time point after a time period after the establishment is completed. In other words, at the any time point, the currently used data transmission path may be switched from the first transmission path to the second transmission path.

It can be learned that, in the foregoing switching process, when the terminal configures the second transmission path corresponding to the Wi-Fi network, configuration information may carry indication information, to indicate, by using the indication information, the terminal to switch from the first transmission path to the second transmission path after a specific time period, unlike the prior art in which the terminal switches from the first transmission path to the second transmission path when configuring the second transmission path. This can resolve a prior-art problem that data transmission of an application is interrupted for a relatively long time because the first transmission path is disconnected and a new TCP connection has not been established between the application and the second transmission path to transmit data. In some embodiments of this application, switching from the first transmission path to the second transmission path may include disconnecting the first transmission path and activating connection of the second transmission path. The terminal switches the currently used data transmission path from the first transmission path to the second transmission path according to the indication information when determining that a second TCP connection is being established or has been established between the specific application and the corresponding server. In other words, the terminal disconnects the first transmission path only when the second TCP connection is being established or has been established between the specific application and the corresponding server. Compared with the prior art, this delays a time point at which the first transmission path is disconnected, and can still ensure that data transmission of the specific application is not interrupted during a delayed time period. A specific length of the delayed time period may depend on a time point when the specific application initiates the second TCP connection to the corresponding server and/or duration required for completing the establishment of the second TCP connection. In this way, duration of interruption of the data transmission of the specific application may be reduced.

In an embodiment, before configuring, by the terminal, a second transmission path corresponding to the Wi-Fi network, the transmission path switching method may further include:

determining, by the terminal, whether the Wi-Fi network requires secondary authentication.

The configuring, by the terminal, a second transmission path corresponding to the Wi-Fi network includes: if terminal determines that the Wi-Fi network does not require secondary authentication, configuring, by the terminal, the second transmission path corresponding to the Wi-Fi network.

In an embodiment, the transmission path switching method may further include:

after the terminal detects the stored wireless fidelity Wi-Fi network, skipping, by the terminal if terminal determines the Wi-Fi network requires secondary authentication, configuring the second transmission path corresponding to the Wi-Fi network.

In an embodiment, the transmission path switching method may further include:

storing, by the terminal, information about whether the Wi-Fi network requires secondary authentication.

In an embodiment, the switching, by the terminal, the currently used data transmission path from the first transmission path to the second transmission path further includes:

sending, by the second module of the terminal, first notification information to the specific application after the second transmission path is configured, where the first notification information is used to notify the specific application that a network status changes.

The switching, by the first module of the terminal, a data transmission path of the specific application from the first transmission path to the second transmission path according to the indication information includes: switching, by the first module of the terminal, the data transmission path of the specific application from the first transmission path to the second transmission path according to the indication information after the second module of the terminal sends the first notification information to the specific application.

In an embodiment, the switching, by the first module of the terminal, the data transmission path of the specific application from the first transmission path to the second transmission path according to the indication information after the second module of the terminal sends the first notification information to the specific application includes:

after the second module of the terminal sends the first notification information to the specific application, and after the specific application sends, by using the first module of the terminal and based on the first notification information, a TCP connection establishment request used to establish the second TCP connection to the server corresponding to the specific application, and the first module of the terminal receives the TCP connection establishment request, switching, by the terminal, the data transmission path of the specific application from the first transmission path to the second transmission path.

It should be understood that, in this embodiment of this application, a time point at which the terminal performs switching after sending the first notification information to the specific application may be any time point in a time period from a time point at which the first notification message is received to a time point at which the second TCP connection starts to be established based on the first notification message or establishment of the second TCP connection is completed, or to a time point after the establishment of the second TCP connection is completed.

It may be understood that, in this embodiment of this application, the terminal first switches the data transmission path of the specific application from the first transmission path to the second transmission path, to ensure normal switching of the specific application currently running in the foreground. Then, the terminal switches a data transmission path of another application other than the specific application from the first transmission path to the second transmission path.

In an embodiment, after the switching, by the terminal, the data transmission path of the specific application from the first transmission path to the second transmission path, the transmission path switching method further includes:

sending, by the terminal, second notification information to another application other than the specific application, where the second notification information is used to notify the another application that a network status changes; and switching, by the terminal, a data transmission path of the another application other than the specific application from first transmission path to the second transmission path after the terminal sends the second notification information to the another application.

In an embodiment, the switching, by the terminal, a data transmission path of the another application other than the specific application from the first transmission path to the second transmission path after the terminal sends the second notification information to the another application includes:

after the terminal sends the second notification information to the another application, and after the another application sends, by using the first module of the terminal and based on the second notification information, a TCP connection establishment request used to establish a Wi-Fi network-based TCP connection to a server corresponding to the another application, and the first module of the terminal receives the TCP connection establishment request, switching, by the terminal, the data transmission path of the another application from the first transmission path to the second transmission path.

It should be understood that, in this embodiment of this application, a time point at which the terminal performs switching after sending the second notification information to a non-specific application may be any time point in a time period from a time point at which the second notification message is received to a time point at which the Wi-Fi network-based TCP connection starts to be established based on the second notification message or establishment of the Wi-Fi network-based TCP connection is completed, or to a time point after the establishment of the second TCP connection is completed.

It may be understood that, after ensuring the normal switching of the specific application currently running in the foreground, the terminal switches the data transmission path of the another application other than the specific application from the first transmission path to the second transmission path, to complete switching of the data transmission path of the another application.

In an embodiment, a menu option of the terminal includes a switching preference setting option, and the switching preference setting option is used by a user to, if a specific application runs on the terminal and when there is a second transmission path corresponding to a wireless fidelity Wi-Fi network, set whether the terminal is allowed to switch the currently used data transmission path from the first transmission path to the second transmission path.

The first condition further includes: the terminal determines, based on the switching preference setting option, that the user allows the terminal to, if a specific application runs on the terminal and when there is a second transmission path corresponding to a wireless fidelity Wi-Fi network, switch the currently used data transmission path from the first transmission path to the second transmission path.

It can be learned that in this embodiment of this application, when the first transmission path is switched to the second transmission path, whether the first condition is met is considered, and an actual requirement or preference of the user is further considered if the first condition is met. In other words, whether to perform data transmission path switching is determined according to the actual requirement or preference of the user. This improves use smoothness of an application, and improves user experience.

In an embodiment, before the switching, by the terminal, the currently used data transmission path from the first transmission path to the second transmission path, the method may further include:

outputting, by the terminal, prompt information by using a small window, where the prompt information is used by the user to determine whether to switch the currently used data transmission path from the first transmission path to the second transmission path; and determining, by the terminal according to a user indication, to switch the currently used data transmission path from the first transmission path to the second transmission path.

It can be learned that in this embodiment of this application, an actual requirement or preference of the user is further considered if the first condition is met. In other words, whether to perform data transmission path switching is determined according to the actual requirement or preference of the user. This improves use smoothness of an application, and improves user experience.

In an embodiment, the specific application is an online game application and/or a video live broadcast application.

In an embodiment, the first notification information includes a current status of the mobile network and a current status of the Wi-Fi network.

In an embodiment, the second notification information includes a current status of the mobile network and a current status of the Wi-Fi network.

In an embodiment, the first module is a kernel module, and second module is a connection management module.

According to a second aspect, an embodiment of this application further provides a transmission path switching method, applied to a terminal. A data transmission path currently used by the terminal is a first transmission path corresponding to a mobile network. A first TCP connection is established between a specific application and a server corresponding to the specific application, and data of the specific application related to first TCP connection is transmitted by using the first transmission path. The transmission path switching method may include:

after the terminal detects a stored wireless fidelity Wi-Fi network, configuring, by the terminal, a second transmission path corresponding to the Wi-Fi network; and when a second TCP connection is being established or has been established between the specific application and the corresponding server, switching, by the terminal, the currently used data transmission path from the first transmission path to the second transmission path, so that data of the specific application related to the second TCP connection is transmitted by using the second transmission path, where the second TCP connection is different from the first TCP connection.

It may be understood that, in this embodiment of this application, when the second TCP connection is being established between the specific application and the corresponding server may mean when a kernel module receives a TCP connection establishment request sent by a client, and in a specific implementation, may mean when the client invokes a socket interface provided by the kernel module. when a second TCP connection is being established or has been established between the specific application and the corresponding server may be understood as any time point in a time period from a time point at which the second TCP connection starts to be established between the specific application and the corresponding server to a time point at which establishment of the second TCP connection between the specific application and the corresponding server is completed, or to a time point after a time period after the establishment is completed. In other words, at the any time point, the currently used data transmission path may be switched from the first transmission path to the second transmission path.

It can be learned that, in this embodiment of this application, when the second transmission path corresponding to the Wi-Fi network is configured, configuration information may carry indication information, to indicate, by using the indication information, the terminal to switch from the first transmission path to the second transmission path after a specific time period. In some embodiments of this application, switching from the first transmission path to the second transmission path may include disconnecting the first transmission path and activating connection of the second transmission path. The terminal switches the currently used data transmission path from the first transmission path to the second transmission path according to the indication information when the second TCP connection is being established or has been established between the specific application and the corresponding server. In other words, the terminal disconnects the first transmission path only when the second TCP connection is being established or has been established between the specific application and the corresponding server. Compared with the prior art, this delays a time point at which the first transmission path is disconnected, and can still ensure that data transmission of the specific application is not interrupted during a delayed time period, to reduce duration in which the data transmission of the specific application is interrupted.

In an embodiment, the switching the currently used data transmission path from the first transmission path to the second transmission path includes:

receiving, by a first module of the terminal, indication information from a second module of the terminal, where the indication information is used to switch the currently used data transmission path from the first transmission path to the second transmission path when the terminal determines that the second TCP connection is being established or has been established between the specific application and the corresponding server; and switching, by the first module of the terminal, the currently used data transmission path from the first transmission path to the second transmission path according to the indication information.

In an embodiment, before the switching, by the terminal, the currently used data transmission path from the first transmission path to the second transmission path, the method may further include:

determining that the Wi-Fi network meets a first condition.

The first condition is related to one or more of the following parameters: signal strength of the Wi-Fi network, signal quality of the Wi-Fi network, duration of the signal strength of the Wi-Fi network, duration of the signal quality of the Wi-Fi network, whether the Wi-Fi network requires secondary authentication, whether data can be transmitted by using the second transmission path, and a rate at which data can be transmitted by using the second transmission path.

In an embodiment, the method further includes: determining, by the terminal, whether the Wi-Fi network meets the first condition.

The determining, by the terminal, whether the Wi-Fi network meets the first condition includes:

if an application currently running in the foreground on the terminal is a specific application, determining, by the terminal, whether the Wi-Fi network meets the first condition.

In an embodiment, a corresponding first condition when the application currently running in the foreground on the terminal is a non-specific application is different from a corresponding first condition when the application currently running in the foreground on the terminal is a specific application.

In an embodiment, the first condition includes at least one of the following:

the signal strength of the Wi-Fi network is greater than a first threshold; or the signal strength of the Wi-Fi network is greater than the first threshold, and duration in which the signal strength of the Wi-Fi network is greater than the first threshold is greater than a second threshold; or the signal quality of the Wi-Fi network meets a third condition; or the signal quality of the Wi-Fi network meets a third condition, and duration in which the signal quality of the Wi-Fi network meets the third condition is greater than a third threshold; or the Wi-Fi network does not require secondary authentication; or data can be transmitted by using the second transmission path; or data can be transmitted by using second transmission path, and a transmission rate is greater than a fourth threshold.

In an embodiment, before configuring, by the terminal, a second transmission path corresponding to the Wi-Fi network, the transmission path switching method may further include:

determining, by the terminal, whether the Wi-Fi network requires secondary authentication.

The configuring, by the terminal, a second transmission path corresponding to the Wi-Fi network includes: if terminal determines that the Wi-Fi network does not require secondary authentication, configuring, by the terminal, the second transmission path corresponding to the Wi-Fi network.

In an embodiment, the transmission path switching method may further include:

after the terminal detects the stored wireless fidelity Wi-Fi network, skipping, by the terminal if terminal determines the Wi-Fi network requires secondary authentication, configuring the second transmission path corresponding to the Wi-Fi network.

In an embodiment, the transmission path switching method may further include:

storing, by the terminal, information about whether the Wi-Fi network requires secondary authentication.

In an embodiment, the switching, by the terminal, the currently used data transmission path from the first transmission path to the second transmission path under a first condition includes:

sending, by the terminal, first notification information to the specific application after the second transmission path is configured, where the first notification information is used to notify the specific application that a network status changes.

The switching, by the first module of the terminal, a data transmission path of the specific application from the first transmission path to the second transmission path according to the indication information includes: switching, by the first module of the terminal, the data transmission path of the specific application from the first transmission path to the second transmission path according to the indication information after the second module of the terminal sends the first notification information to the specific application.

In an embodiment, the switching, by the first module of the terminal, the data transmission path of the specific application from the first transmission path to the second transmission path according to the indication information after the second module of the terminal sends the first notification information to the specific application includes:

after the second module of the terminal sends the first notification information to the specific application, and after the specific application sends, by using the first module of the terminal and based on the first notification information, a TCP connection establishment request used to establish the second TCP connection to the server corresponding to the specific application, and the first module of the terminal receives the TCP connection establishment request, switching, by the terminal, the data transmission path of the specific application from the first transmission path to the second transmission path.

In an embodiment, after the switching, by the terminal, the data transmission path of the specific application from the first transmission path to the second transmission path, the method further includes:

sending, by the terminal, second notification information to another application other than the specific application, where the second notification information is used to notify the another application that a network status changes; and switching, by the terminal, a data transmission path of the another application other than the specific application from first transmission path to the second transmission path after the terminal sends the second notification information to the another application.

In an embodiment, the switching, by the terminal, a data transmission path of the another application other than the specific application from the first transmission path to the second transmission path after the terminal sends the second notification information to the another application includes:

after the terminal sends the second notification information to the another application, and after the another application sends, by using the first module of the terminal and based on the second notification information, a TCP connection establishment request used to establish a Wi-Fi network-based TCP connection to a server corresponding to the another application, and the first module of the terminal receives the TCP connection establishment request, switching, by the terminal, the data transmission path of the another application from the first transmission path to the second transmission path.

In an embodiment, a menu option of the terminal includes a switching preference setting option, and the switching preference setting option is used by a user to, if a specific application runs on the terminal and when there is a second transmission path corresponding to a wireless fidelity Wi-Fi network, set whether the terminal is allowed to switch the currently used data transmission path from the first transmission path to the second transmission path.

The first condition further includes: the terminal determines, based on the switching preference setting option, that the user allows the terminal to, if a specific application runs on the terminal and when there is a second transmission path corresponding to a wireless fidelity Wi-Fi network, switch the currently used data transmission path from the first transmission path to the second transmission path.

In an embodiment, before the switching, by the terminal, the currently used data transmission path from the first transmission path to the second transmission path, the method may further include:

outputting, by the terminal, prompt information by using a small window, where the prompt information is used by the user to determine whether to switch the currently used data transmission path from the first transmission path to the second transmission path; and determining, by the terminal according to a user indication, to switch the currently used data transmission path from the first transmission path to the second transmission path.

In an embodiment, the specific application is an online game application and/or a video live broadcast application.

In an embodiment, the first notification information includes a current status of the mobile network and a current status of the Wi-Fi network.

In an embodiment, the second notification information includes a current status of the mobile network and a current status of the Wi-Fi network.

In an embodiment, the first module is a kernel module, and second module is a connection management module.

According to a third aspect, an embodiment of this application further provides a menu option setting method, applied to a terminal. A menu option includes a switching preference setting option. A data transmission path currently used by the terminal is a first transmission path corresponding to a mobile network. The menu option setting method may include:

the switching preference setting option is used by a user to, if a specific application runs on the terminal and when there is a second transmission path corresponding to a wireless fidelity Wi-Fi network, set whether the terminal is allowed to switch the currently used data transmission path from the first transmission path to the second transmission path.

It can be learned that in this embodiment of this application, the switching preference setting option is set, so that whether to perform data transmission path switching can be determined based on an actual requirement or preference of the user, in other words, based on the actual requirement or preference of the user. This improves use smoothness of an application, and improves user experience.

In an embodiment, the switching preference setting option is set in a setting menu option of the terminal, or the switching preference setting option is set in a setting menu option of an assistant application of an application.

In an embodiment, if the switching preference setting option is set to enabled, and when the terminal has established the second transmission path, the terminal switches the currently used data transmission path from the first transmission path to the second transmission path. Or, if the switching preference setting option is set to disabled, the terminal does not switch the currently used data transmission path from the first transmission path to the second transmission path.

In an embodiment, when the switching preference setting option indicates, by using a pop-up window, that there is an available Wi-Fi network, and the user chooses, by using the pop-up window, to perform network switching, the terminal switches the currently used data transmission path from the first transmission path to the second transmission path.

When the switching preference setting option indicates, by using a pop-up window, that there is an available Wi-Fi network, and the user chooses, by using the pop-up window, not to perform network switching, the terminal does not switch the currently used data transmission path from the first transmission path to the second transmission path.

According to a fourth aspect, an embodiment of this application further provides a transmission path switching apparatus, applied to a terminal. A data transmission path currently used by the terminal is a first transmission path corresponding to a mobile network. The apparatus includes a first module, a second module, and a Wi-Fi communications module.

The second module is configured to, after a stored wireless fidelity Wi-Fi network is detected by the Wi-Fi communications module, configure a second transmission path corresponding to the Wi-Fi network.

The first module is configured to, if the Wi-Fi network meets a first condition, switch the currently used data transmission path from the first transmission path to the second transmission path.

The first condition is related to one or more of the following parameters: signal strength of the Wi-Fi network, signal quality of the Wi-Fi network, duration of the signal strength of the Wi-Fi network, duration of the signal quality of the Wi-Fi network, whether the Wi-Fi network requires secondary authentication, whether data can be transmitted by using the second transmission path, and a rate at which data can be transmitted by using the second transmission path.

In an embodiment, the first module is further configured to determine whether the Wi-Fi network meets the first condition.

That the first module is further configured to determine whether the Wi-Fi network meets the first condition includes:

if an application currently running in the foreground on the terminal is a specific application, the first module is configured to determine whether the Wi-Fi network meets the first condition.

In an embodiment, a corresponding first condition when the application currently running in the foreground on the terminal is a non-specific application is different from a corresponding first condition when the application currently running in the foreground on the terminal is a specific application.

In an embodiment, the first condition includes at least one of the following:

the signal strength of the Wi-Fi network is greater than a first threshold; or the signal strength of the Wi-Fi network is greater than the first threshold, and duration in which the signal strength of the Wi-Fi network is greater than the first threshold is greater than a second threshold; or the signal quality of the Wi-Fi network meets a third condition; or the signal quality of the Wi-Fi network meets a third condition, and duration in which the signal quality of the Wi-Fi network meets the third condition is greater than a third threshold; or the Wi-Fi network does not require secondary authentication; or data can be transmitted by using the second transmission path; or data can be transmitted by using second transmission path, and a transmission rate is greater than a fourth threshold.

In an embodiment, a first TCP connection is established between the specific application and a server corresponding to the specific application, and data of the specific application related to the first TCP connection is transmitted by using the first transmission path. The first module includes a receiving sub-module and a switching sub-module. That the first module is configured to switch the currently used data transmission path from the first transmission path to the second transmission path includes:

the receiving sub-module is configured to receive indication information from the second module of the terminal, where the indication information is used to switch the currently used data transmission path from the first transmission path to the second transmission path when the terminal determines that the second TCP connection is being established or has been established between the specific application and the corresponding server, where the second TCP connection is different from the first TCP connection; and the switching sub-module is configured to switch the currently used data transmission path from the first transmission path to the second transmission path according to the indication information, so that data of the specific application related to the second TCP connection is transmitted by using the second transmission path.

In an embodiment, that the second module is configured to, after the stored wireless fidelity Wi-Fi network is detected by the Wi-Fi communications module, configure the second transmission path corresponding to the Wi-Fi network includes:

the second module is configured to, after the stored wireless fidelity Wi-Fi network is detected by the Wi-Fi communications module, and if the Wi-Fi network does not require secondary authentication, configure the second transmission path corresponding to the Wi-Fi network.

In an embodiment, the second module is further configured not to, after the stored wireless fidelity Wi-Fi network is detected by the Wi-Fi communications module, and if the Wi-Fi network requires secondary authentication, configure the second transmission path corresponding to the Wi-Fi network.

In an embodiment, the transmission path switching apparatus further includes a storage module.

The storage module is configured to store information about whether the Wi-Fi network requires secondary authentication.

In an embodiment, the second module is further configured to send first notification information to the specific application after the second transmission path is configured. The first notification information is used to notify the specific application that a network status changes.

The switching sub-module is specifically configured to switch a data transmission path of the specific application from the first transmission path to the second transmission path according to the indication information after the second module sends the first notification information to the specific application.

In an embodiment, that the switching sub-module is configured to switch the data transmission path of the specific application from the first transmission path to the second transmission path according to the indication information after the second module sends the first notification information to the specific application includes:

after the second module sends the first notification information to the specific application, and after the specific application sends, by using the first module of the terminal and based on the first notification information, a TCP connection establishment request used to establish the second TCP connection to the server corresponding to the specific application, and the first module of the terminal receives the TCP connection establishment request, the switching sub-module is configured to switch the data transmission path of the specific application from the first transmission path to the second transmission path.

In an embodiment, the second module is further configured to send second notification information to another application other than the specific application after the switching sub-module switches the data transmission path of the specific application from the first transmission path to the second transmission path. The second notification information is used to notify the another application that a network status changes.

The switching sub-module is further configured to switch a data transmission path of the another application other than the specific application from the first transmission path to the second transmission path after the second module sends the second notification information to the another application.

In an embodiment, that the switching sub-module is configured to switch the data transmission path of the another application other than the specific application from the first transmission path to the second transmission path after the second module sends the second notification information to the another application includes:

after the second module sends the second notification information to the another application, and after the another application sends, by using the first module of the terminal and based on the second notification information, a TCP connection establishment request used to establish a Wi-Fi network-based TCP connection to a server corresponding to the another application, and the first module of the terminal receives the TCP connection establishment request, the switching sub-module is configured to switch the data transmission path of the another application from the first transmission path to the second transmission path.

In an embodiment, a menu option of the terminal includes a switching preference setting option, and the switching preference setting option is used by a user to, if a specific application runs on the terminal and when there is a second transmission path corresponding to a wireless fidelity Wi-Fi network, set whether the terminal is allowed to switch the currently used data transmission path from the first transmission path to the second transmission path.

The first condition further includes: the terminal determines, based on the switching preference setting option, that the user allows the terminal to, if a specific application runs on the terminal and when there is a second transmission path corresponding to a wireless fidelity Wi-Fi network, switch the currently used data transmission path from the first transmission path to the second transmission path.

In an embodiment, the transmission path switching apparatus further includes:

a processing module, configured to output prompt information by using a small window, where the prompt information is used by the user to determine whether to switch the currently used data transmission path from the first transmission path to the second transmission path.

The first module is further configured to determine, according to a user indication, to switch the currently used data transmission path from the first transmission path to the second transmission path.

In an embodiment, the specific application is an online game application and/or a video live broadcast application.

In an embodiment, the first notification information includes a current status of the mobile network and a current status of the Wi-Fi network.

In an embodiment, the second notification information includes a current status of the mobile network and a current status of the Wi-Fi network.

In an embodiment, the first module is a kernel module, and second module is a connection management module.

Optionally, the transmission path switching apparatus in the fourth aspect may be the terminal, or may be a component (for example, a chip or a circuit) that can be configured in the terminal.

According to a fifth aspect, an embodiment of this application further provides a transmission path switching apparatus, applied to a terminal. A data transmission path currently used by the terminal is a first transmission path corresponding to a mobile network. A first TCP connection is established between a specific application and a server corresponding to the specific application, and data of the specific application related to first TCP connection is transmitted by using the first transmission path. The apparatus includes:

a second module, configured to, after a stored wireless fidelity Wi-Fi network is detected by using a Wi-Fi communications module of the terminal, configure a second transmission path corresponding to the Wi-Fi network; and a first module, configured to switch the currently used data transmission path from the first transmission path to the second transmission path when a second TCP connection is being established or has been established between the specific application and the corresponding server, so that data of the specific application related to the second TCP connection is transmitted by using the second transmission path, where the second TCP connection is different from the first TCP connection.

In an embodiment, the first module includes a receiving sub-module and a switching sub-module. That the first module is configured to switch the currently used data transmission path from the first transmission path to the second transmission path when the second TCP connection is being established or has been established between the specific application and the corresponding server includes:

the receiving sub-module is configured to receive indication information from the second module, where the indication information is used to indicate the terminal to switch the currently used data transmission path from the first transmission path to the second transmission path when the second TCP connection is being established or has been established between the specific application and the corresponding server; and the switching sub-module is configured to switch the currently used data transmission path from the first transmission path to the second transmission path according to the indication information when the second TCP connection is being established or has been established between the specific application and the corresponding server.

In an embodiment, that the first module is configured to switch the currently used data transmission path from the first transmission path to the second transmission path when the second TCP connection is being established or has been established between the specific application and the corresponding server includes:

the first module is configured to switch the currently used data transmission path from the first transmission path to the second transmission path when the Wi-Fi network meets a first condition and when the second TCP connection is being established or has been established between the specific application and the corresponding server.

The first condition is related to one or more of the following parameters: signal strength of the Wi-Fi network, signal quality of the Wi-Fi network, duration of the signal strength of the Wi-Fi network, duration of the signal quality of the Wi-Fi network, whether the Wi-Fi network requires secondary authentication, whether data can be transmitted by using the second transmission path, and a rate at which data can be transmitted by using the second transmission path.

In an embodiment, the first module is further configured to determine whether the Wi-Fi network meets the first condition.

That the first module is further configured to determine whether the Wi-Fi network meets the first condition includes:

if an application currently running in the foreground on the terminal is a specific application, the first module is configured to determine whether the Wi-Fi network meets the first condition.

In an embodiment, a corresponding first condition when the application currently running in the foreground on the terminal is a non-specific application is different from a corresponding first condition when the application currently running in the foreground on the terminal is a specific application.

In an embodiment, the first condition includes at least one of the following:

the signal strength of the Wi-Fi network is greater than a first threshold; or the signal strength of the Wi-Fi network is greater than the first threshold, and duration in which the signal strength of the Wi-Fi network is greater than the first threshold is greater than a second threshold; or the signal quality of the Wi-Fi network meets a third condition; or the signal quality of the Wi-Fi network meets a third condition, and duration in which the signal quality of the Wi-Fi network meets the third condition is greater than a third threshold; or the Wi-Fi network does not require secondary authentication; or data can be transmitted by using the second transmission path; or data can be transmitted by using second transmission path, and a transmission rate is greater than a fourth threshold.

In an embodiment, that the second module is configured to, after the stored wireless fidelity Wi-Fi network is detected by the Wi-Fi communications module, configure the second transmission path corresponding to the Wi-Fi network includes:

the second module is configured to, after the stored wireless fidelity Wi-Fi network is detected by the Wi-Fi communications module, and if the Wi-Fi network does not require secondary authentication, configure the second transmission path corresponding to the Wi-Fi network.

In an embodiment, the second module is further configured not to, after the stored wireless fidelity Wi-Fi network is detected by the Wi-Fi communications module, and if the Wi-Fi network requires secondary authentication, configure the second transmission path corresponding to the Wi-Fi network.

In an embodiment, the apparatus further includes a storage module.

The storage module is configured to store information about whether the Wi-Fi network requires secondary authentication.

In an embodiment, the second module is further configured to send first notification information to the specific application after the second transmission path is configured. The first notification information is used to notify the specific application that a network status changes.

The switching sub-module is specifically configured to switch a data transmission path of the specific application from the first transmission path to the second transmission path according to the indication information after the second module sends the first notification information to the specific application.

In an embodiment, that the switching sub-module is configured to switch the data transmission path of the specific application from the first transmission path to the second transmission path according to the indication information after the second module sends the first notification information to the specific application includes:

after the second module sends the first notification information to the specific application, and after the specific application sends, by using the first module of the terminal and based on the first notification information, a TCP connection establishment request used to establish the second TCP connection to the server corresponding to the specific application, and the first module of the terminal receives the TCP connection establishment request, the switching sub-module is configured to switch the data transmission path of the specific application from the first transmission path to the second transmission path.

In an embodiment, the second module is further configured to send second notification information to another application other than the specific application after the switching sub-module switches the data transmission path of the specific application from the first transmission path to the second transmission path. The second notification information is used to notify the another application that a network status changes.

The switching sub-module is further configured to switch a data transmission path of the another application other than the specific application from the first transmission path to the second transmission path after the second module sends the second notification information to the another application.

In an embodiment, that the switching sub-module is configured to switch the data transmission path of the another application other than the specific application from the first transmission path to the second transmission path after the second module sends the second notification information to the another application includes:

after the second module sends the second notification information to the another application, and after the another application sends, by using the first module of the terminal and based on the second notification information, a TCP connection establishment request used to establish a Wi-Fi network-based TCP connection to a server corresponding to the another application, and the first module of the terminal receives the TCP connection establishment request, the switching sub-module is configured to switch the data transmission path of the another application from the first transmission path to the second transmission path.

In an embodiment, a menu option of the terminal includes a switching preference setting option, and the switching preference setting option is used by a user to, if a specific application runs on the terminal and when there is a second transmission path corresponding to a wireless fidelity Wi-Fi network, set whether the terminal is allowed to switch the currently used data transmission path from the first transmission path to the second transmission path.

The first condition further includes: the terminal determines, based on the switching preference setting option, that the user allows the terminal to, if a specific application runs on the terminal and when there is a second transmission path corresponding to a wireless fidelity Wi-Fi network, switch the currently used data transmission path from the first transmission path to the second transmission path.

In an embodiment, the transmission path switching apparatus further includes:

a processing module, configured to output prompt information by using a small window, where the prompt information is used by the user to determine whether to switch the currently used data transmission path from the first transmission path to the second transmission path.

The first module is further configured to determine, according to a user indication, to switch the currently used data transmission path from the first transmission path to the second transmission path.

In an embodiment, the specific application is an online game application and/or a video live broadcast application.

In an embodiment, the first notification information includes a current status of the mobile network and a current status of the Wi-Fi network.

In an embodiment, the second notification information includes a current status of the mobile network and a current status of the Wi-Fi network.

In an embodiment, the first module is a kernel module, and second module is a connection management module.

Optionally, the transmission path switching apparatus in the fifth aspect may be the terminal, or may be a component (for example, a chip or a circuit) that can be configured in the terminal.

According to a sixth aspect, an embodiment of this application further provides a menu option setting apparatus, applied to a terminal. A menu option includes a switching preference setting option. A data transmission path currently used by the terminal is a first transmission path corresponding to a mobile network. The menu option setting apparatus includes a setting module and a switching module.

The setting module is configured to set the switching preference setting option. The switching preference setting option is used by a user to, if a specific application runs on the terminal and when there is a second transmission path corresponding to a wireless fidelity Wi-Fi network, set whether the switching module is allowed to switch the currently used data transmission path from the first transmission path to the second transmission path.

In an embodiment, the switching preference setting option is set in a setting menu option of the terminal, or the switching preference setting option is set in a setting menu option of an assistant application of an application.

In an embodiment, if the switching preference setting option is set to enabled, and when the terminal has established the second transmission path, the switching module is configured to switch the currently used data transmission path from the first transmission path to the second transmission path; or if the switching preference setting option is set to disabled, the switching module does not switch the currently used data transmission path from the first transmission path to the second transmission path.

In an embodiment, when the switching preference setting option indicates, by using a pop-up window, that there is an available Wi-Fi network, and the user chooses, by using the pop-up window, to perform network switching, the switching module is further configured to switch the currently used data transmission path from the first transmission path to the second transmission path; and when the switching preference setting option indicates, by using a pop-up window, that there is an available Wi-Fi network, and the user chooses, by using the pop-up window, not to perform network switching, the switching module does not switch the currently used data transmission path from the first transmission path to the second transmission path.

Optionally, the menu option setting apparatus in the sixth aspect may be the terminal, or may be a component (for example, a chip or a circuit) that can be configured in the terminal.

According to a seventh aspect, an embodiment of this application further provides a transmission path switching apparatus, applied to a terminal. A data transmission path currently used by the terminal is a first transmission path corresponding to a mobile network. The apparatus includes an application processor and a Wi-Fi communications module.

The application processor is configured to: after a stored wireless fidelity Wi-Fi network is detected by the Wi-Fi communications module, configure a second transmission path corresponding to the Wi-Fi network; and if the Wi-Fi network meets a first condition, switch the currently used data transmission path from the first transmission path to the second transmission path.

The first condition is related to one or more of the following parameters: signal strength of the Wi-Fi network, signal quality of the Wi-Fi network, duration of the signal strength of the Wi-Fi network, duration of the signal quality of the Wi-Fi network, whether the Wi-Fi network requires secondary authentication, whether data can be transmitted by using the second transmission path, and a rate at which data can be transmitted by using the second transmission path.

In an embodiment, the application processor is further configured to determine whether the Wi-Fi network meets the first condition.

That the application processor is further configured to determine whether the Wi-Fi network meets the first condition includes:

if an application currently running in the foreground on the terminal is a specific application, the application processor is configured to determine whether the Wi-Fi network meets the first condition.

In an embodiment, a corresponding first condition when the application currently running in the foreground on the terminal is a non-specific application is different from a corresponding first condition when the application currently running in the foreground on the terminal is a specific application.

In an embodiment, the first condition includes at least one of the following:

the signal strength of the Wi-Fi network is greater than a first threshold; or the signal strength of the Wi-Fi network is greater than the first threshold, and duration in which the signal strength of the Wi-Fi network is greater than the first threshold is greater than a second threshold; or the signal quality of the Wi-Fi network meets a third condition; or the signal quality of the Wi-Fi network meets a third condition, and duration in which the signal quality of the Wi-Fi network meets the third condition is greater than a third threshold; or the Wi-Fi network does not require secondary authentication; or data can be transmitted by using the second transmission path; or data can be transmitted by using second transmission path, and a transmission rate is greater than a fourth threshold.

In an embodiment, a first TCP connection is established between the specific application and a server corresponding to the specific application, and data of the specific application related to the first TCP connection is transmitted by using the first transmission path. The application processor includes a first module and a second module. That the application processor is configured to switch the currently used data transmission path from the first transmission path to the second transmission path includes:

the first module is configured to receive indication information from the second module of the terminal, where the indication information is used to switch the currently used data transmission path from the first transmission path to the second transmission path when the terminal determines that a second TCP connection is being established or has been established between the specific application and the corresponding server, where the second TCP connection is different from the first TCP connection; and the application processor is configured to switch the currently used data transmission path from the first transmission path to the second transmission path according to the indication information, so that data of the specific application related to the second TCP connection is transmitted by using the second transmission path.

In an embodiment, the application processor is further configured to determine whether the Wi-Fi network requires secondary authentication.

That the application processor is configured to configure the second transmission path corresponding to the Wi-Fi network includes:

the application processor is configured to, if the Wi-Fi network does not require secondary authentication, configure the second transmission path corresponding to the Wi-Fi network.

In an embodiment, the application processor is further configured not to, after the stored wireless fidelity Wi-Fi network is detected by the Wi-Fi communications module, and if the Wi-Fi network requires secondary authentication, configure the second transmission path corresponding to the Wi-Fi network.

In an embodiment, the transmission path switching apparatus further includes a memory.

The memory is configured to store information about whether the Wi-Fi network requires secondary authentication.

In an embodiment, the application processor is further configured to send first notification information to the specific application after the second transmission path is configured. The first notification information is used to notify the specific application that a network status changes.

That the application processor is configured to switch the currently used data transmission path from the first transmission path to the second transmission path according to the indication information includes: the application processor is configured to switch a data transmission path of the specific application from the first transmission path to the second transmission path according to the indication information after the application processor sends the first notification information to the specific application.

In an embodiment, that the application processor is configured to switch the data transmission path of the specific application from the first transmission path to the second transmission path according to the indication information after sending the first notification information to the specific application includes:

after the application processor sends the first notification information to the specific application, and after the specific application sends, by using the first module of the terminal and based on the first notification information, a TCP connection establishment request used to establish the second TCP connection to the server corresponding to the specific application, and the first module of the terminal receives the TCP connection establishment request, the application processor switches the data transmission path of the specific application from the first transmission path to the second transmission path.

In an embodiment, the application processor is further configured to: send second notification information to another application other than the specific application after switching the data transmission path of the specific application from the first transmission path to the second transmission path, where the second notification information is used to notify the another application that a network status changes; and switch a data transmission path of the another application other than the specific application from the first transmission path to the second transmission path after sending the second notification information to the another application.

In an embodiment, that the application processor switches the data transmission path of the another application other than the specific application from the first transmission path to the second transmission path after sending the second notification information to the another application includes:

after the application processor sends the second notification information to the another application, and after the another application sends, by using the first module of the terminal and based on the second notification information, a TCP connection establishment request used to establish a Wi-Fi network-based TCP connection to a server corresponding to the another application, and the first module of the terminal receives the TCP connection establishment request, the application processor switches the data transmission path of the another application from the first transmission path to the second transmission path.

In an embodiment, a menu option of the terminal includes a switching preference setting option, and the switching preference setting option is used by a user to, if a specific application runs on the terminal and when there is a second transmission path corresponding to a wireless fidelity Wi-Fi network, set whether the terminal is allowed to switch the currently used data transmission path from the first transmission path to the second transmission path.

The first condition further includes: the terminal determines, based on the switching preference setting option, that the user allows the terminal to, if a specific application runs on the terminal and when there is a second transmission path corresponding to a wireless fidelity Wi-Fi network, switch the currently used data transmission path from the first transmission path to the second transmission path.

In an embodiment, the application processor is further configured to output prompt information by using a small window. The prompt information is used by the user to determine whether to switch the currently used data transmission path from the first transmission path to the second transmission path.

The application processor is further configured to determine, according to a user indication, to switch the currently used data transmission path from the first transmission path to the second transmission path.

In an embodiment, the specific application is an online game application and/or a video live broadcast application.

In an embodiment, the first notification information includes a current status of the mobile network and a current status of the Wi-Fi network.

In an embodiment, the second notification information includes a current status of the mobile network and a current status of the Wi-Fi network.

In an embodiment, the first module is a kernel module, and second module is a connection management module.

According to an eighth aspect, an embodiment of this application further provides a transmission path switching apparatus, applied to a terminal. A data transmission path currently used by the terminal is a first transmission path corresponding to a mobile network. A first TCP connection is established between a specific application and a server corresponding to the specific application, and data of the specific application related to first TCP connection is transmitted by using the first transmission path. The apparatus includes an application processor and a Wi-Fi communications module.

The application processor is configured to: after a stored wireless fidelity Wi-Fi network is detected by the Wi-Fi communications module, configure a second transmission path corresponding to the Wi-Fi network; and switch the currently used data transmission path from the first transmission path to the second transmission path when a second TCP connection is being established or has been established between the specific application and the corresponding server, so that data of the specific application related to the second TCP connection is transmitted by using the second transmission path, where the second TCP connection is different from the first TCP connection.

In an embodiment, the application processor includes a first module and a second module.

The first module is configured to receive indication information from the second module. The indication information is used to switch the currently used data transmission path from the first transmission path to the second transmission path when the terminal determines that the second TCP connection is being established or has been established between the specific application and the corresponding server.

The first module is configured to switch the currently used data transmission path from the first transmission path to the second transmission path according to the indication information when the second TCP connection is being established or has been established between the specific application and the corresponding server.

In an embodiment, that the application processor is configured to switch the currently used data transmission path from the first transmission path to the second transmission path when the second TCP connection is being established or has been established between the specific application and the corresponding server includes:

the application processor is configured to switch the currently used data transmission path from the first transmission path to the second transmission path when the Wi-Fi network meets a first condition and when the second TCP connection is being established or has been established between the specific application and the corresponding server.

The first condition is related to one or more of the following parameters: signal strength of the Wi-Fi network, signal quality of the Wi-Fi network, duration of the signal strength of the Wi-Fi network, duration of the signal quality of the Wi-Fi network, whether the Wi-Fi network requires secondary authentication, whether data can be transmitted by using the second transmission path, and a rate at which data can be transmitted by using the second transmission path.

In an embodiment, the application processor is further configured to determine whether the Wi-Fi network meets the first condition.

That the application processor is further configured to determine whether the Wi-Fi network meets the first condition includes:

if an application currently running in the foreground on the terminal is a specific application, the application processor is configured to determine whether the Wi-Fi network meets the first condition.

In an embodiment, a corresponding first condition when the application currently running in the foreground on the terminal is a non-specific application is different from a corresponding first condition when the application currently running in the foreground on the terminal is a specific application.

In an embodiment, the first condition includes at least one of the following:

the signal strength of the Wi-Fi network is greater than a first threshold; or the signal strength of the Wi-Fi network is greater than the first threshold, and duration in which the signal strength of the Wi-Fi network is greater than the first threshold is greater than a second threshold; or the signal quality of the Wi-Fi network meets a third condition; or the signal quality of the Wi-Fi network meets a third condition, and duration in which the signal quality of the Wi-Fi network meets the third condition is greater than a third threshold; or the Wi-Fi network does not require secondary authentication; or data can be transmitted by using the second transmission path; or data can be transmitted by using second transmission path, and a transmission rate is greater than a fourth threshold.

In an embodiment, the application processor is further configured to determine whether the Wi-Fi network requires secondary authentication.

That the application processor is configured to configure the second transmission path corresponding to the Wi-Fi network includes:

the application processor is configured to, if the Wi-Fi network does not require secondary authentication, configure the second transmission path corresponding to the Wi-Fi network.

In an embodiment, the application processor is further configured not to, after the stored wireless fidelity Wi-Fi network is detected by the Wi-Fi communications module, and if the Wi-Fi network requires secondary authentication, configure the second transmission path corresponding to the Wi-Fi network.

In an embodiment, the apparatus further includes a memory.

The memory is configured to store information about whether the Wi-Fi network requires secondary authentication.

In an embodiment, the application processor is further configured to:

send first notification information to the specific application after the second transmission path is configured, where the first notification information is used to notify the specific application that a network status changes; and switch a data transmission path of the specific application from the first transmission path to the second transmission path after the application processor sends the first notification information to the specific application.

In an embodiment, that the application processor is configured to switch the data transmission path of the specific application from the first transmission path to the second transmission path after sending the first notification information to the specific application includes:

after the application processor sends the first notification information to the specific application, and after the specific application sends, by using the first module of the terminal and based on the first notification information, a TCP connection establishment request used to establish the second TCP connection to the server corresponding to the specific application, and the first module of the terminal receives the TCP connection establishment request, the application processor switches the data transmission path of the specific application from the first transmission path to the second transmission path.

In an embodiment, the application processor is further configured to:

send second notification information to another application other than the specific application after switching the data transmission path of the specific application from the first transmission path to the second transmission path, where the second notification information is used to notify the another application that a network status changes; and switch a data transmission path of the another application other than the specific application from the first transmission path to the second transmission path after sending the second notification information to the another application.

In an embodiment, that the application processor switches the data transmission path of the another application other than the specific application from the first transmission path to the second transmission path after sending the second notification information to the another application includes:

after the application processor sends the second notification information to the another application, and after the another application sends, by using the first module of the terminal and based on the second notification information, a TCP connection establishment request used to establish a Wi-Fi network-based TCP connection to a server corresponding to the another application, and the first module of the terminal receives the TCP connection establishment request, the application processor switches the data transmission path of the another application from the first transmission path to the second transmission path.

In an embodiment, a menu option of the terminal includes a switching preference setting option, and the switching preference setting option is used by a user to, if a specific application runs on the terminal and when there is a second transmission path corresponding to a wireless fidelity Wi-Fi network, set whether the terminal is allowed to switch the currently used data transmission path from the first transmission path to the second transmission path.

The first condition further includes: the terminal determines, based on the switching preference setting option, that the user allows the terminal to, if a specific application runs on the terminal and when there is a second transmission path corresponding to a wireless fidelity Wi-Fi network, switch the currently used data transmission path from the first transmission path to the second transmission path.

In an embodiment, the application processor is further configured to output prompt information by using a small window. The prompt information is used by the user to determine whether to switch the currently used data transmission path from the first transmission path to the second transmission path.

The application processor is further configured to determine, according to a user indication, to switch the currently used data transmission path from the first transmission path to the second transmission path.

In an embodiment, the specific application is an online game application and/or a video live broadcast application.

In an embodiment, the first notification information includes a current status of the mobile network and a current status of the Wi-Fi network.

In an embodiment, the second notification information includes a current status of the mobile network and a current status of the Wi-Fi network.

In an embodiment, the first module is a kernel module, and second module is a connection management module.

Optionally, the transmission path switching apparatus in the eighth aspect may be the terminal, or may be a component (for example, a chip or a circuit) that can be configured in the terminal.

According to a ninth aspect, an embodiment of this application further provides a menu option setting apparatus, applied to a terminal. A menu option includes a switching preference setting option. A data transmission path currently used by the terminal is a first transmission path corresponding to a mobile network. The menu option setting apparatus may include:

an application processor, configured to set the switching preference setting option, where the switching preference setting option is used by a user to, if a specific application runs on the terminal and when there is a second transmission path corresponding to a wireless fidelity Wi-Fi network, set whether the terminal is allowed to switch the currently used data transmission path from the first transmission path to the second transmission path.

In an embodiment, the switching preference setting option is set in a setting menu option of the terminal, or the switching preference setting option is set in a setting menu option of an assistant application of an application.

In an embodiment, if the switching preference setting option is set to enabled, and when the terminal has established the second transmission path, the application processor is further configured to switch the currently used data transmission path from the first transmission path to the second transmission path; or if the switching preference setting option is set to disabled, the application processor does not switch the currently used data transmission path from the first transmission path to the second transmission path.

In an embodiment, when the switching preference setting option indicates, by using a pop-up window, that there is an available Wi-Fi network, and the user chooses, by using the pop-up window, to perform network switching, the application processor is further configured to switch the currently used data transmission path from the first transmission path to the second transmission path; and when the switching preference setting option indicates, by using a pop-up window, that there is an available Wi-Fi network, and the user chooses, by using the pop-up window, not to perform network switching, the application processor does not switch the currently used data transmission path from the first transmission path to the second transmission path.

Optionally, the menu option setting apparatus in the ninth aspect may be the terminal, or may be a component (for example, a chip or a circuit) that can be configured in the terminal.

According to a tenth aspect, an embodiment of this application further provides a communications apparatus. The communications apparatus includes a processor and a memory.

The memory is configured to store a program instruction.

The processor is configured to: read the program instruction in the memory, and perform, according to the program instruction in the memory, the transmission path switching method according to any one of the possible implementations of the first aspect, or perform, according to the program instruction in the memory, the transmission path switching method according to any one of the possible implementations of the second aspect, or perform, according to the program instruction in the memory, the menu option setting method according to any one of the possible implementations of the third aspect.

According to an eleventh aspect, an embodiment of this application further provides a computer storage medium, including an instruction. When the instruction is run by one or more processors, a communications apparatus is enabled to perform the transmission path switching method according to any one of the possible implementations of the first aspect, or perform the transmission path switching method according to any one of the possible implementations of the second aspect, or perform the menu option setting method according to any one of the possible implementations of the third aspect.

According to a twelfth aspect, an embodiment of this application provides a program product. The program product includes a computer program, and the computer program is stored in a readable storage medium. At least one processor of a communications apparatus may read the computer program from the readable storage medium, and the at least one processor executes the computer program, to enable the communications apparatus to: perform the transmission path switching method according to any one of the possible implementations of the first aspect; or perform the transmission path switching method according to any one of the possible implementations of the second aspect; or perform the menu option setting method according to any one of the possible implementations of the third aspect.

According to a thirteenth aspect, an embodiment of this application provides a communications apparatus. The communications apparatus includes a processing module, and the processing module is configured to: perform the transmission path switching method according to any one of the possible implementations of the first aspect; or perform the transmission path switching method according to any one of the possible implementations of the second aspect; or perform the menu option setting method according to any one of the possible implementations of the third aspect.

In an embodiment, the communications apparatus further includes a storage module. The storage module is configured to store an instruction. The processing module is configured to execute the instruction stored in the storage module, so that the processing module performs the transmission path switching method according to any one of the possible implementations of the first aspect.

In an embodiment, the communications apparatus is a chip or a chip system.

According to a fourteenth aspect, an embodiment of this application provides an apparatus, applied to user equipment UE. The apparatus is configured to: implement the transmission path switching method according to any one of the possible implementations of the first aspect; or implement the transmission path switching method according to any one of the possible implementations of the second aspect; or implement the menu option setting method according to any one of the possible implementations of the third aspect.

According to a fifteenth aspect, an embodiment of this application provides a computer program product. When the computer program product is read and executed by a computer, the transmission path switching method according to any one of the possible implementations of the first aspect, or the transmission path switching method according to any one of the possible implementations of the second aspect, or the menu option setting method according to any one of the possible implementations of the third aspect is executed.

It can be learned that, according to the transmission path switching method and apparatus provided in the embodiments of this application, when a transmission path is switched, the currently used data transmission path is not directly switched from the first transmission path to the second transmission path after the second transmission path is configured, but after it is further determined that the first condition is met, the currently used data transmission path is switched from the first transmission path to the second transmission path, to avoid data interruption in a process of switching the data transmission path of the application from the first transmission path to the second transmission path. This improves use smoothness of the application.

DESCRIPTION OF EMBODIMENTS

The embodiments of this application are applied to a long term evolution (LTE) architecture, and may be further applied to another communications system, for example, a public land mobile network (PLMN) system, a 5G communications system, or another system that may emerge in the future. The following explains and describes some terms in this application, to help a person skilled in the art have a better understanding. It should be noted that, when solutions in the embodiments of this application are applied to the 5G communications system or the another system that may emerge in the future, names of a network device and a terminal may change, but this does not affect implementation of the solutions in the embodiments of this application.

Figure 1:
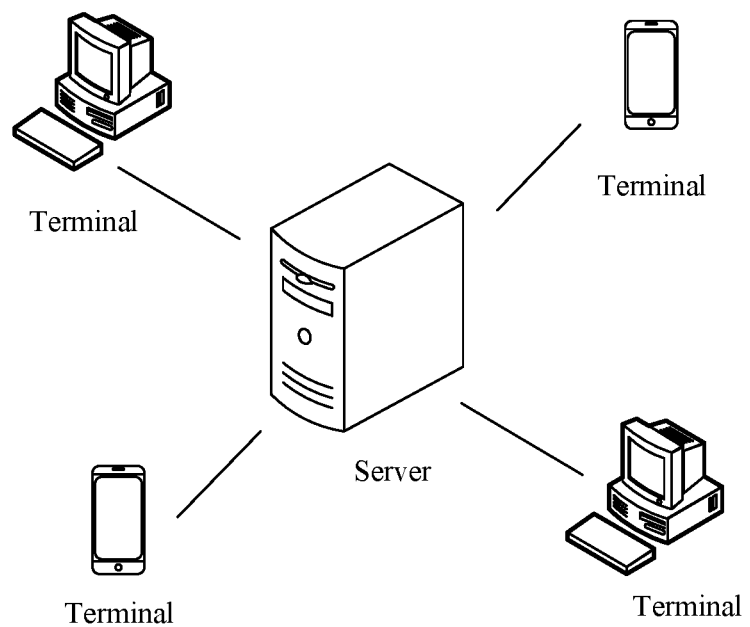
FIG. 1 is a schematic diagram of an application scenario according to an embodiment of this application.

FIG. 1 is a schematic diagram of an application scenario according to an embodiment of this application. The communications system may include a server and at least one terminal device. For example, referring to FIG. 1, to resolve a prior-art problem that a relatively long period of data interruption is caused, and consequently, use smoothness of an application is poor when a terminal is switched to a Wi-Fi network by first disconnecting a currently connected mobile network (for example, an LTE network), then configuring the Wi-Fi network, and after the configuration, reconnecting the terminal to the Wi-Fi network for data transmission, an embodiment of this application provides a transmission path switching method. A data transmission path currently used by the terminal is a first transmission path corresponding to a mobile network. A first TCP connection is established between a specific application and a server corresponding to the specific application, and data of the specific application related to the first TCP connection is transmitted by using the first transmission path. After the terminal detects a stored wireless fidelity Wi-Fi network, and the terminal configures a second transmission path corresponding to the Wi-Fi network, the terminal switches the currently used data transmission path to the second transmission path when ensuring that the second transmission path is established and available, so that data of the specific application related to the second TCP connection is transmitted by using the second transmission path, to avoid data interruption during data transmission of the application in a process of switching the data transmission path from the first transmission path to the second transmission path. This improves use smoothness of the application. The second TCP connection is different from the first TCP connection.

Before the transmission path is switched, the terminal detects the stored Wi-Fi network, and the terminal configures the second transmission path corresponding to the Wi-Fi network. After the second transmission path is configured (in other words, the second transmission path has been established), the terminal does not directly switch the currently used data transmission path from the first transmission path to the second transmission path. Instead, when the Wi-Fi network meets a first condition, the terminal switches the currently used data transmission path from the first transmission path to the second transmission path, to ensure that the currently used data transmission path is switched to the second transmission path when the second transmission path is established and available (a condition for using the second transmission path is that, for example, the first condition is met), to avoid data interruption in the process of switching the data transmission path of the application from the first transmission path to the second transmission path. This improves use smoothness of the application.

In the foregoing switching process, when the terminal configures the second transmission path corresponding to the Wi-Fi network, configuration information may carry indication information, to indicate, by using the indication information, the terminal to switch from the first transmission path to the second transmission path after a specific time period, unlike the prior art in which the terminal switches from the first transmission path to the second transmission path when configuring the second transmission path. This can resolve a prior-art problem that data transmission of an application is interrupted for a relatively long time because the first transmission path is disconnected and a new TCP connection has not been established between the application and the second transmission path to transmit data. In some embodiments of this application, switching from the first transmission path to the second transmission path may include disconnecting the first transmission path and activating connection of the second transmission path. The terminal switches the currently used data transmission path from the first transmission path to the second transmission path according to the indication information when determining that a second TCP connection is being established or has been established between the specific application and the corresponding server. In other words, the terminal disconnects the first transmission path only when the second TCP connection is being established or has been established between the specific application and the corresponding server. Compared with the prior art, this delays a time point at which the first transmission path is disconnected, and can still ensure that data transmission of the specific application is not interrupted during a delayed time period. A specific length of the delayed time period may depend on a time point when the specific application initiates the second TCP connection to the corresponding server and/or duration required for completing the establishment of the second TCP connection. In this way, duration of interruption of the data transmission of the specific application may be reduced.

It may be understood that, in this embodiment of this application, when the second TCP connection is being established between the specific application and the corresponding server may mean when a kernel module receives a TCP connection establishment request sent by a client, and in a specific implementation, may mean when the client invokes a socket interface provided by the kernel module. When a second TCP connection is being established or has been established between the specific application and the corresponding server may be understood as any time point in a time period from a time point at which the second TCP connection starts to be established between the specific application and the corresponding server to a time point at which establishment of the second TCP connection between the specific application and the corresponding server is completed, or to a time point after a time period after the establishment is completed. In other words, at the any time point, the currently used data transmission path may be switched from the first transmission path to the second transmission path.

When a specific application on the terminal initiates a TCP connection establishment request, the terminal first binds a current specific application to the second transmission path corresponding to the Wi-Fi network to perform data transmission, and then binds all other applications to the second transmission path. In this way, service freezing, of the specific application, that is caused by binding all applications to the second transmission path at the same time can be effectively avoided.

It should be noted that, in this embodiment of this application, when the transmission path switching method is performed, the terminal may be a terminal that does not support dual connectivity. Supporting dual connectivity may be understood as supporting both a mobile network and a Wi-Fi network at the same time. When the terminal that does not support dual connectivity performs transmission path switching, a transmission path switching process is performed only when the specific application on the terminal initiates the TCP connection establishment request or the second TCP connection has been established.

(1) The terminal is also referred to as a terminal device or user equipment, and is a device that provides voice and/or data connectivity for a user, for example, a handheld device or a vehicle-mounted device that has a wireless connection function. For example, common terminal devices include a mobile phone, a tablet computer, a notebook computer, a palmtop computer, a mobile internet device (MID), and a wearable device. For example, wearable devices include a smart watch, a smart band, and a pedometer.

(2) The server is a core for providing a service for the client, and features high performance, high reliability, high availability, high I/O throughput, large storage capacity, and strong networking and network management capabilities. The server may be a physical entity, a logical functional entity, or a chip disposed in a physical entity.

(3) In the embodiments of this application, "at least one" means one or more, and "a plurality of" means two or more. The term "and/or" describes an association relationship between associated objects and represents that three relationships may exist. For example, A and/or B may represent the following three cases: Only A exists, both A and B exist, and only B exists. A and B may be in a singular or plural form. In the text description of this application, the character "/" represents an "or" relationship between the associated objects. In a formula in this application, the character "/" indicates a "division" relationship between the associated objects.

It should be noted that, in the foregoing possible implementations, the terminal sets a default transmission path for data transmission as the second transmission path when it is ensured that the second transmission path is established and available. In this solution, it may be understood that the first transmission path and the second transmission path coexist, and there is no concept of data transmission path switching. Provided that the first condition is met, the second transmission path may be set as the default transmission path for data transmission, so that data is transmitted by using the second transmission path. Compared with a case in which the first transmission path and the second transmission path coexist, in the foregoing two possible implementations, there may be only one data transmission path. Herein, data transmission path switching needs to be performed. When the first condition is met, the terminal switches the currently used data transmission path from the first transmission path to the second transmission path, to switch the data transmission path currently used by the terminal to the second transmission path, so that data is transmitted by using the second transmission path.

It may be understood that the foregoing two possible implementations are merely used as examples for description in this embodiment of this application, but this does not mean that this embodiment of this application is limited thereto. The following describes in detail, by using detailed embodiments, a technical solution in which the terminal has only one data transmission path and needs to switch from the currently used first transmission path to the second transmission path.

Figure 2:
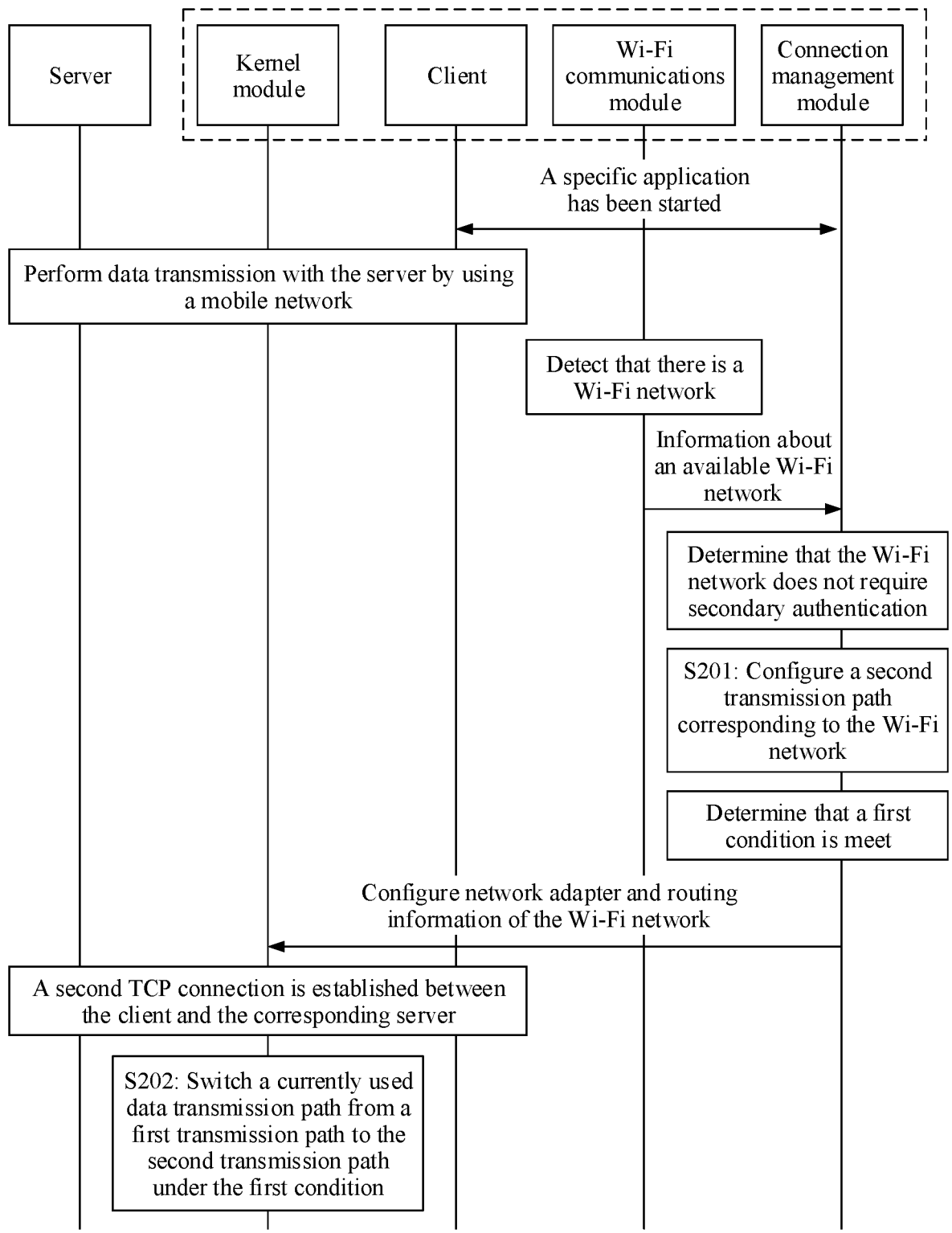
FIG. 2 is a schematic flowchart of a transmission path switching method according to an embodiment of this application.

For example, referring to FIG. 2, FIG. 2 is a schematic flowchart of a transmission path switching method according to an embodiment of this application. The transmission path switching method may be applied to a terminal, and a data transmission path currently used by the terminal is a first transmission path corresponding to a mobile network, in other words, data transmission is performed between the terminal and a server by using the mobile network. Optionally, data that is currently transmitted may include data of a specific application, in other words, the specific application has been started. The transmission path switching method may include the following steps.

S201: A connection management module of the terminal detects a stored wireless fidelity Wi-Fi network, and configures a second transmission path corresponding to the Wi-Fi network.

For example, the connection management module of the terminal is a software module, and may be disposed at a framework layer (Framework) of an operating system (for example, an Android operating system) of the terminal. In other words, the connection management module in the framework of the terminal detects the stored Wi-Fi network, and configures the second transmission path corresponding to the Wi-Fi network.

Optionally, in this embodiment of this application, when detecting that there is a Wi-Fi network, a Wi-Fi communications module of the terminal device sends information about an available Wi-Fi network to the connection management module of the terminal device, so that after receiving the information, the connection management module first determines whether the Wi-Fi network requires secondary authentication. If the Wi-Fi network does not require secondary authentication, it indicates that after the Wi-Fi network is connected, data transmission may be directly performed by using the Wi-Fi network, and identity authentication does not need to be performed again. In this case, the connection management module of the terminal may configure the second transmission path corresponding to the Wi-Fi network. On the contrary, if the Wi-Fi network requires secondary authentication, it indicates that after the Wi-Fi network is connected, data transmission still cannot be performed by using the Wi-Fi network, but data transmission can be normally performed only after the Wi-Fi network is connected and authentication is performed again by using, for example, an SMS verification code or by using a user name and a password. In this case, the connection management module of the terminal does not configure the second transmission path corresponding to the Wi-Fi network. It should be noted that, in this embodiment of this application, whether the Wi-Fi network requires secondary authentication may be determined by a user, the Wi-Fi communications module, or a second module that may be specifically set according to an actual requirement. This is not specifically limited in this embodiment of this application.

It should be noted that each time after determining whether the Wi-Fi network requires secondary authentication, the connection management module of the terminal may store information about whether the Wi-Fi network requires secondary authentication. In this way, when a Wi-Fi network is subsequently detected, and if the stored information includes information about whether the Wi-Fi network requires secondary authentication, whether the Wi-Fi network requires secondary authentication may be directly determined based on the stored information about whether the Wi-Fi network requires secondary authentication, to improve transmission path switching efficiency.

When the second transmission path corresponding to the Wi-Fi network is configured, network adapter and routing information for configuring the Wi-Fi network is sent to a kernel module (namely, a Kernel module, which is a software module corresponding to a kernel in the operating system of the terminal) of the terminal, so that the kernel module of the terminal establishes a connection between a client of the terminal and the server based on the network adapter and routing information for configuring the Wi-Fi network. However, after the connection is established, the currently used data transmission path is not directly switched from the first transmission path to the second transmission path, but the following S202 is performed.

S202: If the Wi-Fi network meets a first condition, the kernel module of the terminal switches the currently used data transmission path from the first transmission path to the second transmission path.

The first condition is related to one or more of the following parameters: signal strength of the Wi-Fi network, signal quality of the Wi-Fi network, duration of the signal strength of the Wi-Fi network, duration of the signal quality of the Wi-Fi network, whether the Wi-Fi network requires secondary authentication, whether data can be transmitted by using the second transmission path, and a rate at which data can be transmitted by using the second transmission path. The duration of the signal strength of the Wi-Fi network is used to ensure stability of the signal strength of the Wi-Fi network in a data transmission process, to avoid data transmission interruption caused by unstable signal strength of the Wi-Fi network. Similarly, the duration of the signal quality of the Wi-Fi network is used to ensure stability of the signal quality of the Wi-Fi network in a data transmission process, to avoid data transmission interruption caused by unstable signal quality of the Wi-Fi network. The signal quality may be understood as a ratio relationship between a wanted signal and noise, for example, reference signal received quality (RSRQ), and a signal to interference plus noise ratio (SINR).

Further, the first condition includes at least one of the following: the signal strength of the Wi-Fi network is greater than a first threshold; or the signal strength of the Wi-Fi network is greater than the first threshold, and duration in which the signal strength of the Wi-Fi network is greater than the first threshold is greater than a second threshold; or the signal quality of the Wi-Fi network meets a third condition; or the signal quality of the Wi-Fi network meets a third condition, and duration in which the signal quality of the Wi-Fi network meets the third condition is greater than a third threshold; or the Wi-Fi network does not require secondary authentication; or data can be transmitted by using the second transmission path; or data can be transmitted by using the second transmission path, and a transmission rate is greater than a fourth threshold. It should be noted that a value of the first threshold, the second threshold, the third condition, the third threshold, or the fourth threshold in the first condition may be specifically determined based on a type of an application currently running in the foreground on the terminal, and the first threshold, the second threshold, the third condition, the third threshold, or the fourth threshold in the first condition has different values corresponding to different types of applications. Herein, the value of the first threshold, the second threshold, the third condition, the third threshold, or the fourth threshold is not specifically limited in this embodiment of this application.

For example, before whether the Wi-Fi network meets the first condition is determined, it may be first determined whether the application currently running in the foreground on the terminal is a specific application, and if the application currently running in the foreground on the terminal is a specific application, whether the Wi-Fi network meets the first condition is determined.

It should be understood that a corresponding first condition when the application currently running in the foreground on the terminal is a non-specific application is different from a corresponding first condition when the application currently running in the foreground on the terminal is a specific application. It should be noted that, in this embodiment of this application, that the first condition corresponding to the non-specific application is different from the first condition corresponding to the specific application may be understood as that parameters in the first condition are the same, but parameter values corresponding to the parameters are different, or may be understood that the parameters in the first condition are different, and may be specifically set according to an actual requirement.

The specific application is an online game application and/or a video live broadcast application/or an augmented reality (AR) related and virtual reality (VR) related application. This type of specific application, for example, a game application, has a relatively high requirement on real-time performance, bandwidth and the like of data transmission. Compared with this type of specific application, a non-specific application has a relatively low requirement on real-time performance of data transmission. Therefore, generally, the value, of the first threshold, the second threshold, the third condition, the third threshold, or the fourth threshold in the first condition, corresponding to this type of specific application is greater than the value, of the first threshold, the second threshold, the third condition, the third threshold, or the fourth threshold in the first condition, corresponding to the non-specific application. Therefore, data transmission paths corresponding to different types of applications can be flexibly switched based on different values.

Optionally, a menu option of the terminal may further include a switching preference setting option. The switching preference setting option is used by a user to, if a specific application runs on the terminal and when there is a second transmission path corresponding to a wireless fidelity Wi-Fi network, set whether the terminal is allowed to switch the currently used data transmission path from the first transmission path to the second transmission path. Correspondingly, the first condition further includes: the terminal determines, based on the switching preference setting option, that the user allows the terminal to, if a specific application runs on the terminal and when there is a second transmission path corresponding to a wireless fidelity Wi-Fi network, switch the currently used data transmission path from the first transmission path to the second transmission path.

The switching preference setting option is set to determine, if a specific application runs on the terminal and when there is a second transmission path corresponding to a Wi-Fi network, whether to switch the currently used data transmission path from the first transmission path to the second transmission path. It should be noted that the determining process may be performed before determining whether the first condition is met, or may be performed after it is determined that the first condition is met. If the switching preference setting option indicates to, if a specific application runs on the terminal and when there is a second transmission path corresponding to a Wi-Fi network, switch the currently used data transmission path from the first transmission path to the second transmission path, whether the first condition is met may be further determined. If the switching preference setting option indicates not to, if a specific application runs on the terminal and when there is a second transmission path corresponding to a Wi-Fi network, switch the currently used data transmission path from the first transmission path to the second transmission path, whether the first condition is met does not need to be further determined, to reduce power consumption of the terminal.

It can be learned that, according to the transmission path switching method provided in the embodiments of this application, the currently used data transmission path is not directly switched from the first transmission path to the second transmission path after the second transmission path is configured, but after it is further determined that the first condition is met, the currently used data transmission path is switched from the first transmission path to the second transmission path, to avoid data interruption in a process of switching the data transmission path of the application from the first transmission path to the second transmission path. This improves use smoothness of the application.

It should be noted that in the embodiment shown in FIG. 2, in a process of determining, based on the first condition, to switch the currently used data transmission path from the first transmission path to the second transmission path, an entity for determining whether the first condition is met is the connection management module of the terminal. It may be understood that, in this embodiment of this application, the entity for determining whether the first condition is met may alternatively be a Wi-Fi communications module in the terminal, and may be specifically set based on an actual requirement. This is not specifically limited in this embodiment of this application.

Figure 3A:
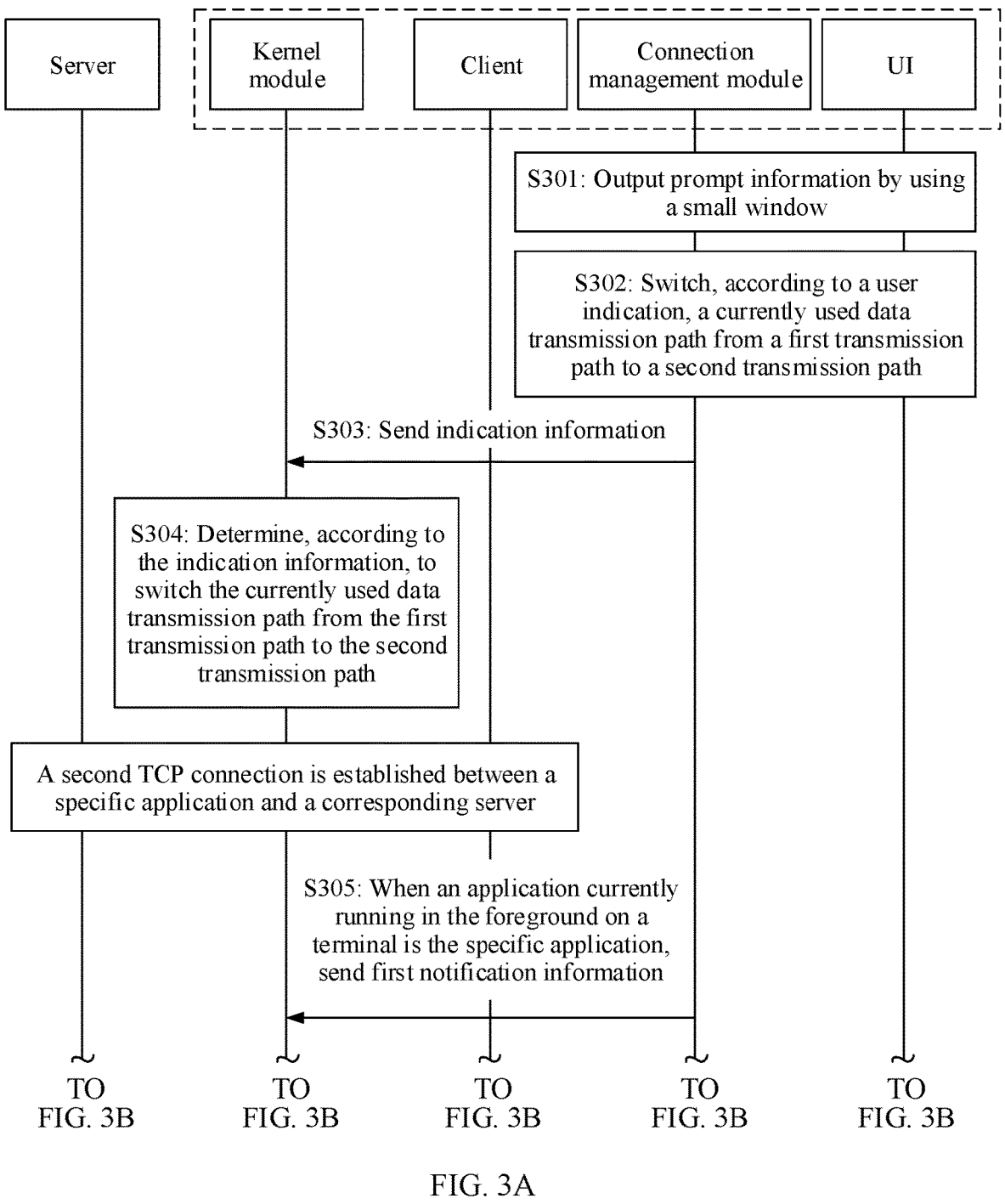
FIG. 3A and FIG. 3B are a schematic flowchart of another transmission path switching method according to an embodiment of this application.
Figure 3B:
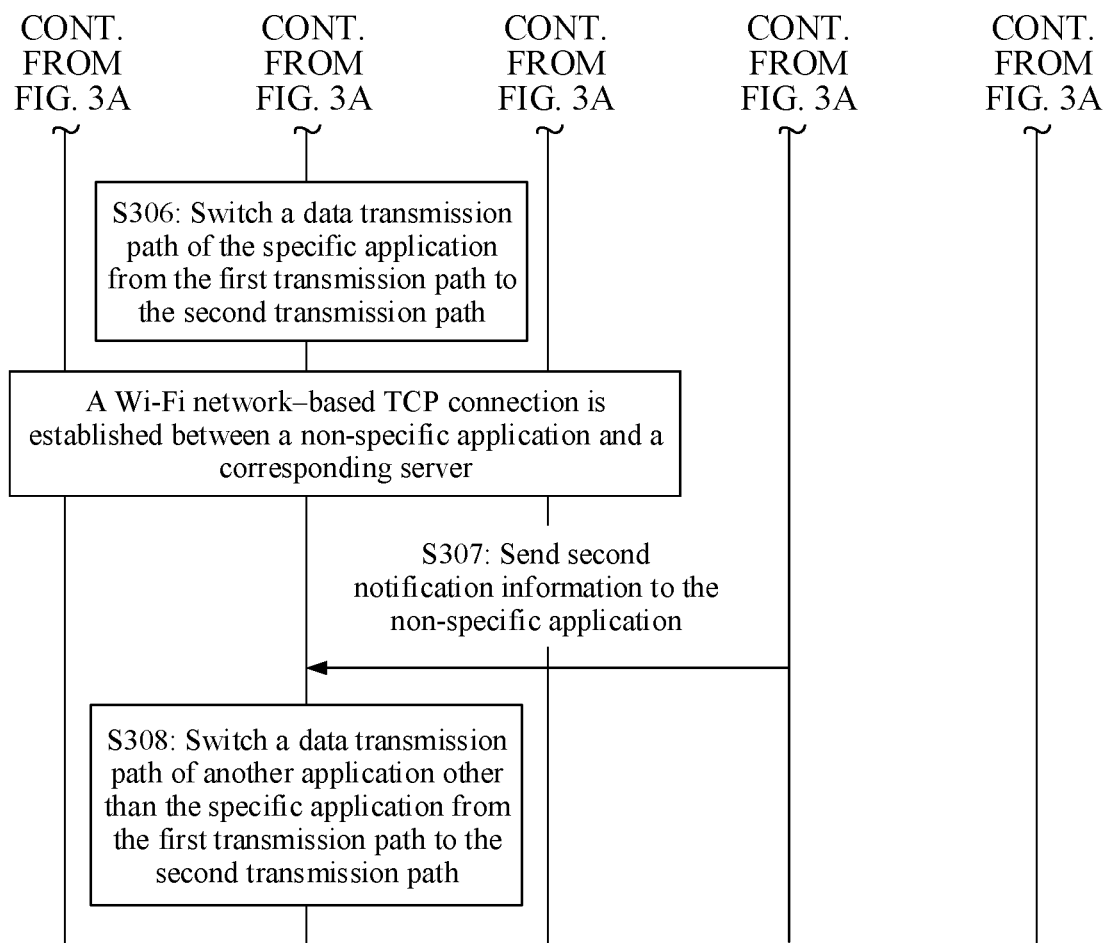

In the embodiment shown in FIG. 2, a technical solution in which the connection management module of the terminal determines, under the first condition, that the currently used data transmission path may be switched from the first transmission path to the second transmission path is described in detail. Based on the embodiment shown in FIG. 2, how the terminal switches the currently used data transmission path from the first transmission path to the second transmission path after determining to switch the currently used data transmission path from the first transmission path to the second transmission path is further described in detail in an embodiment shown in FIG. 3A and FIG. 3B. For example, referring to FIG. 3A and FIG. 3B, FIG. 3A and FIG. 3B are a schematic flowchart of another transmission path switching method according to an embodiment of this application. The transmission path switching method may include the following steps.

S301: The connection management module of the terminal outputs prompt information by using a small window.

The prompt information is used by the user to determine whether to switch the currently used data transmission path from the first transmission path to the second transmission path. It may be understood that, when the prompt information is output, the prompt information may be output in a user interface (UI) of the terminal. For example, the prompt information may be displayed in a form of text, or may be displayed in a form of picture. In this way, after the prompt information is displayed, the user may enter a user selection on a screen of the terminal, so that the terminal determines, based on the user selection, whether to switch the currently used data transmission path from the first transmission path to the second transmission path.

It is determined, according to the embodiment shown in FIG. 2, that the terminal may switch the currently used data transmission path from the first transmission path to the second transmission path. However, to meet a requirement of the user, after it is determined, according to the embodiment shown in FIG. 2, that the terminal may switch the currently used data transmission path from the first transmission path to the second transmission path, the prompt information may be further output by using the small window, so that the prompt information is used to determine whether the user wants to switch the currently used data transmission path from the first transmission path to the second transmission path. If the currently used data transmission path is switched from the first transmission path to the second transmission path according to a user selection indication, the connection management module of the terminal may perform the following step S302.

S302: The connection management module of the terminal determines, according to a user indication, to switch the currently used data transmission path from the first transmission path to the second transmission path.

It should be noted that in this embodiment of this application, S301 and S302 are performed under the first condition in S202 after the kernel module of the terminal determines to switch the currently used data transmission path from the first transmission path to the second transmission path. It may be understood that S301 and S302 may also be performed after S201. To be specific, after the connection management module of the terminal detects the stored wireless fidelity Wi-Fi network and configures the second transmission path corresponding to the Wi-Fi network, S301 and S302 are performed. If S301 and S302 indicate to switch the currently used data transmission path from the first transmission path to the second transmission path, S202 is performed. If S301 and S302 indicate not to switch the currently used data transmission path from the first transmission path to the second transmission path, S202 does not need to be performed.

After the connection management module of the terminal determines, according to S301 and S302, that the user needs to switch the currently used data transmission path from the first transmission path to the second transmission path, the following steps S303 to S308 may be performed to switch the currently used data transmission path from the first transmission path to the second transmission path.

S303: A second module of the terminal sends indication information to a first module of the terminal.

The indication information is used to switch the currently used data transmission path from the first transmission path to the second transmission path when the terminal determines that a second TCP connection is being established or has been established between the specific application and the corresponding server. For example, the indication information may include two types of information: data transmission path indication information and delay indication information. The data transmission path indication information is used to indicate to switch the currently used data transmission path from the first transmission path to the second transmission path. The delay indication information may be used to indicate a time point at which data transmission path switch is performed. The time point is a time point corresponding to the following case: when the terminal determines that the second TCP connection is being established or has been established between the specific application and the corresponding server. It may be understood that the time point in this embodiment of this application may be any time point in a time period from a time point at which the terminal determines that the second TCP connection is being established between the specific application and the corresponding server to a time point after a preset time period after the terminal determines that the connection has been established between the specific application and the corresponding server. The time point at which the terminal determines that the second TCP connection is being established between the specific application and the corresponding server may be a time point at which the kernel module of the terminal receives a TCP connection establishment request that is sent by a client (a client of the specific application) and that is used to establish the second TCP connection, and in a specific implementation, may be a time point at which the client invokes a socket interface provided by the kernel module.

For example, the second module of the terminal may be understood as the connection management module of the terminal, and the first module of the terminal may be the kernel module of the terminal. After determining to switch the currently used data transmission path from the first transmission path to the second transmission path, the connection management module of the terminal may send an indication information to the kernel module of the terminal, so that the kernel module of the terminal determines, according to the indication information, to switch the currently used data transmission path from the first transmission path to the second transmission path. In other words, the following S304 is performed.

S304: The kernel module of the terminal determines, according to the indication information, to switch the currently used data transmission path from the first transmission path to the second transmission path, so that data of the specific application related to the second TCP connection is transmitted by using the second transmission path.

It should be noted that in this embodiment of this application, S303 and S304 are performed to further determine, by sending the indication information when the first condition is met, to perform data transmission path switching when the second TCP connection is being established or has been established between the specific application and the corresponding server, to avoid data interruption in a process of switching the data transmission path of the application from the first transmission path to the second transmission path, and therefore, use smoothness of the application can be further improved.

S303 and S304 are performed to ensure that a connection has been established between the specific application and the corresponding server before data transmission. This can avoid data interruption in a data transmission path switching process. It may be understood that, in the data transmission path switching process, to ensure normal switching of the specific application currently running in the foreground, a data transmission path of the specific application may be first switched from the first transmission path to the second transmission path, and then a data transmission path of another application other than the specific application is switched from the first transmission path to the second transmission path, in other words, the following S305 to S308 are performed. Certainly, the data transmission paths of the specific application and the another application other than the specific application may alternatively be switched from the first transmission path to the second transmission path at the same time. In this embodiment of this application, that the data transmission path of the specific application is first switched from the first transmission path to the second transmission path, and then the data transmission path of the another application other than the specific application is switched from the first transmission path to the second transmission path is merely used as an example for description. However, this does not mean that this embodiment of this application is limited thereto.

S305: If the Wi-Fi network meets the first condition, the connection management module of the terminal sends first notification information to the specific application after the second transmission path is configured.

The first notification information is used to notify the specific application that a network status changes. It should be noted that, that notifying the specific application that the network status changes may specifically be: notifying the specific application that a mobile network connection is now disconnected and a Wi-Fi network connection is now established (although the mobile network connection has not been disconnected actually and the Wi-Fi network connection has not been established yet).

Optionally, the first notification information may include a current status of the mobile network and a current status of the Wi-Fi network, and certainly, may include other information. In this embodiment of this application, that the first notification information includes the current status of the mobile network and the current status of the Wi-Fi network is merely used as an example for description. However, this does not mean that this embodiment of this application is limited thereto.

For example, when sending the first notification information to the specific application, the connection management module of the terminal may send the first notification information to the specific application in a broadcast manner, or may send the first notification information to the specific application in a unicast manner, so that the specific application obtains the current status of the mobile network and the current status of the Wi-Fi network, and sends a TCP connection update request message to the kernel module of the terminal after obtaining the first notification information. Therefore, the kernel module of the terminal switches the data transmission path of the specific application from the first transmission path to the second transmission path, in other words, the following S306 is performed.

S306: After the terminal sends the first notification information to the specific application, in other words, after the second module of the terminal sends the first notification information to the specific application, the kernel module of the terminal switches the data transmission path of the specific application from the first transmission path to the second transmission path.

For example, after the terminal sends the first notification information to the specific application, after the specific application sends, by using the first module of the terminal and based on the first notification information, a TCP connection establishment request used to establish the second TCP connection to the server corresponding to the specific application, and the first module of the terminal receives the TCP connection establishment request, the terminal switches the data transmission path of the specific application from the first transmission path to the second transmission path.

It should be understood that, in this embodiment of this application, a time point at which the terminal performs switching after sending the first notification information to the specific application may be any time point in a time period from a time point at which the first notification message is received to a time point at which the second TCP connection starts to be established based on the first notification message or establishment of the second TCP connection is completed, or to a time point after the establishment of the second TCP connection is completed.

The kernel module of the terminal may first switches the data transmission path of the specific application from the first transmission path to the second transmission path, to first ensure normal switching of the specific application currently running in the foreground, and then S307 and S308 are performed to switch the data transmission path of the another application other than the specific application from the first transmission path to the second transmission path.

S307: The connection management module of the terminal sends second notification information to the another application other than the specific application.

The second notification information is used to notify the another application that a network status changes. It may also be noted that, that notifying the another application that the network status changes may specifically be: notifying the another application that a mobile network connection is now disconnected and a Wi-Fi network connection is now established (actually, the mobile network connection has been disconnected and the Wi-Fi network connection has been established).

Optionally, the second notification information also includes the current status of the mobile network and the current status of the Wi-Fi network, and certainly, may also include other information. In this embodiment of this application, that the second notification information includes the current status of the mobile network and the current status of the Wi-Fi network is merely used as an example for description. However, this does not mean that this embodiment of this application is limited thereto.

For example, when sending the second notification information to the another application other than the specific application, the connection management module of the terminal may send the second notification information to the another application other than the specific application in a broadcast manner, or may send the second notification information to the another application other than the specific application in a unicast manner, so that the another application other than the specific application obtains the current status of the mobile network and the current status of the Wi-Fi network.

S308: The kernel module of the terminal switches the data transmission path of the another application other than the specific application from first transmission path to the second transmission path after the terminal sends the second notification information to the another application.

For example, after the terminal sends the second notification information to the another application, and after the another application sends, by using the first module of the terminal and based on the second notification information, a TCP connection establishment request used to establish a Wi-Fi network-based TCP connection to a server corresponding to the another application, and the first module of the terminal receives the TCP connection establishment request, the terminal switches the data transmission path of the another application from the first transmission path to the second transmission path.

It should be understood that, in this embodiment of this application, a time point at which the terminal performs switching after sending the second notification information to a non-specific application may be any time point in a time period from a time point at which the second notification message is received to a time point at which the Wi-Fi network-based TCP connection starts to be established based on the second notification message or establishment of the Wi-Fi network-based TCP connection is completed, or to a time point after the establishment of the second TCP connection is completed.

After receiving the second notification message, the kernel module of the terminal may switch the data transmission path of the another application other than the specific application from the first transmission path to the second transmission path. Therefore, if no data interruption occurs in a process of switching the data transmission path of the specific application from the first transmission path to the second transmission path, no data interruption appears in a process of switching the data transmission path of the another application other than the specific application from the first transmission path to the second transmission path, to improve use smoothness of the application.

Figure 4:
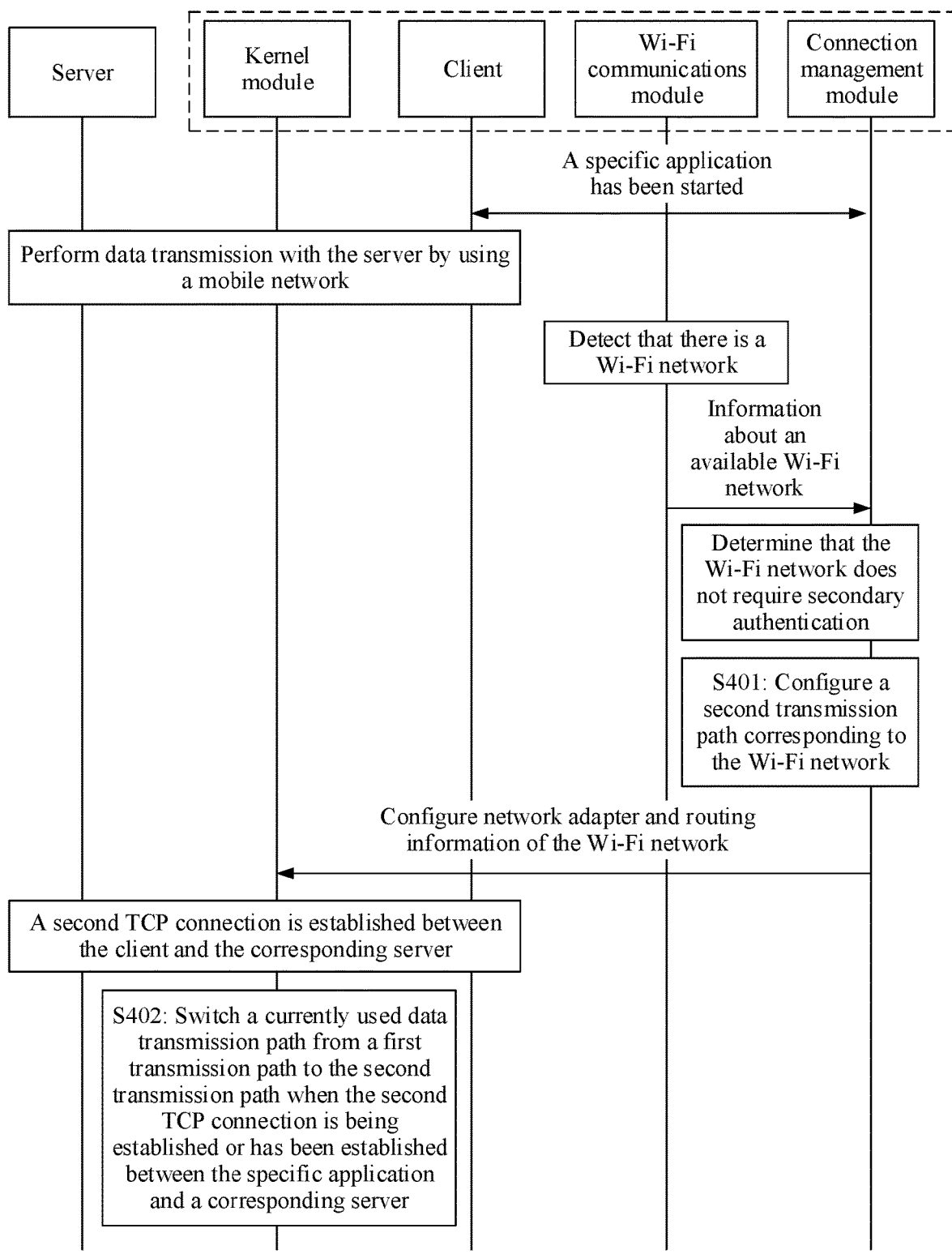
FIG. 4 is a schematic flowchart of a transmission path switching method according to an embodiment of this application.

The embodiments shown in FIG. 2, FIG. 3A, and FIG. 3B describe in detail the technical solution of how to switch from the currently used first transmission path to the second transmission path when the terminal has only one data transmission path. In addition, in the prior art, the terminal switches the first transmission path to the second transmission path when the second transmission path is configured. Therefore, data transmission of an application is interrupted for a relatively long time because the first transmission path is disconnected. An embodiment of this application further provides a transmission path switching method. When the terminal configures the second transmission path corresponding to the Wi-Fi network, configuration information may carry indication information, to indicate, by using the indication information, the terminal to switch from the first transmission path to the second transmission path after a specific time period. In some embodiments of this application, switching from the first transmission path to the second transmission path may include disconnecting the first transmission path and activating connection of the second transmission path. The terminal switches the currently used data transmission path from the first transmission path to the second transmission path according to the indication information when determining that the second TCP connection is being established or has been established between the specific application and the corresponding server. In other words, the terminal disconnects the first transmission path only when the second TCP connection is being established or has been established between the specific application and the corresponding server. Compared with the prior art, this delays a time point at which the first transmission path is disconnected, and can still ensure that data transmission of the specific application is not interrupted during a delayed time period, to reduce duration in which the data transmission of the specific application is interrupted. For example, referring to FIG. 4, FIG. 4 is a schematic flowchart of a transmission path switching method according to an embodiment of this application. The transmission path switching method may also be applied to a terminal. A data transmission path currently used by the terminal is a first transmission path corresponding to a mobile network. A first TCP connection is established between a specific application and a server corresponding to the specific application, and data of the specific application related to first TCP connection is transmitted by using the first transmission path. The transmission path switching method may include the following steps.

S401: A connection management module of the terminal detects a stored wireless fidelity Wi-Fi network, and configures a second transmission path corresponding to the Wi-Fi network.

It should be noted that, in this embodiment of this application, an implementation of S401 is similar to an implementation of S201 in the embodiment shown in FIG. 2. For details, refer to related descriptions of S201 in the embodiment shown in FIG. 2. Details are not described again in this embodiment of this application.

When the second transmission path corresponding to the Wi-Fi network is configured, network adapter and routing information for configuring the Wi-Fi network is sent to a kernel module of the terminal, so that the kernel module of the terminal establishes a connection between an application of the terminal and a server based on the network adapter and the routing information for configuring the Wi-Fi network, and the following S402 is performed.

S402: When a second TCP connection is being established or has been established between the specific application and the corresponding server, the kernel module of the terminal switches the currently used data transmission path from the first transmission path to the second transmission path, so that data of the specific application related to the second TCP connection is transmitted by using the second transmission path.

The second TCP connection is different from the first TCP connection.

Optionally, in this embodiment of this application, a first module of the terminal may receive indication information from a second module of the terminal. The indication information is used to switch the currently used data transmission path from the first transmission path to the second transmission path when the terminal determines that the second TCP connection is being established or has been established between the specific application and the corresponding server. The first module switches the currently used data transmission path from the first transmission path to the second transmission path according to the indication information. For example, the second module of the terminal may be understood as the connection management module of the terminal, and the first module of the terminal may be the kernel module of the terminal.

It should be noted that, in this embodiment of this application, an implementation of S402 is similar to an implementation of S302 and S303 in the embodiment shown in FIG. 3A. For details, refer to related descriptions of S302 and S303 in the embodiment shown in FIG. 3A. Details are not described again in this embodiment of this application.

Optionally, when the second TCP connection is being established or has been established between the specific application and the corresponding server, before the kernel module of the terminal switches the currently used data transmission path from the first transmission path to the second transmission path, the connection management module of the terminal may further determine whether the Wi-Fi network meets a first condition. If the Wi-Fi network meets the first condition, the kernel module of the terminal switches the currently used data transmission path from the first transmission path to the second transmission path.

The first condition is related to one or more of the following parameters: signal strength of the Wi-Fi network, signal quality of the Wi-Fi network, duration of the signal strength of the Wi-Fi network, duration of the signal quality of the Wi-Fi network, whether the Wi-Fi network requires secondary authentication, whether data can be transmitted by using the second transmission path, and a rate at which data can be transmitted by using the second transmission path. The duration of the signal strength of the Wi-Fi network is used to ensure stability of the signal strength of the Wi-Fi network in a data transmission process, to avoid data transmission interruption caused by unstable signal strength of the Wi-Fi network.

Further, the first condition includes at least one of the following: the signal strength of the Wi-Fi network is greater than a first threshold; or the signal strength of the Wi-Fi network is greater than the first threshold, and duration in which the signal strength of the Wi-Fi network is greater than the first threshold is greater than a second threshold; or the signal quality of the Wi-Fi network meets a third condition; or the signal quality of the Wi-Fi network meets a third condition, and duration in which the signal quality of the Wi-Fi network meets the third condition is greater than a third threshold; or the Wi-Fi network does not require secondary authentication; or data can be transmitted by using the second transmission path; or data can be transmitted by using the second transmission path, and a transmission rate is greater than a fourth threshold. It should be noted that a value of the first threshold, the second threshold, the third condition, the third threshold, or the fourth threshold in the first condition may be specifically determined based on a type of an application currently running in the foreground on the terminal, and the first threshold, the second threshold, the third condition, the third threshold, or the fourth threshold in the first condition has different values corresponding to different types of applications. Herein, the value of the first threshold, the second threshold, the third condition, the third threshold, or the fourth threshold is not specifically limited in this embodiment of this application.

For example, before whether the Wi-Fi network meets the first condition is determined, it may be first determined whether the application currently running in the foreground on the terminal is a specific application, and if the application currently running in the foreground on the terminal is a specific application, whether the Wi-Fi network meets the first condition is determined.

It should be understood that a corresponding first condition when the application currently running in the foreground on the terminal is a non-specific application is different from a corresponding first condition when the application currently running in the foreground on the terminal is a specific application. The specific application is an online game application and/or a video live broadcast application. This type of specific application, for example, a game application, has a relatively high requirement on real-time performance and the like of data transmission. Compared with this type of specific application, a non-specific application has a relatively low requirement on real-time performance of data transmission. Therefore, generally, the value, of the first threshold, the second threshold, the third condition, the third threshold, or the fourth threshold in the first condition, corresponding to this type of specific application is greater than the value, of the first threshold, the second threshold, the third condition, the third threshold, or the fourth threshold in the first condition, corresponding to the non-specific application. Therefore, data transmission paths corresponding to different types of applications can be flexibly switched based on different values.

Optionally, a menu option of the terminal may further include a switching preference setting option. The switching preference setting option is used by a user to, if a specific application runs on the terminal and when there is a second transmission path corresponding to a wireless fidelity Wi-Fi network, set whether the terminal is allowed to switch the currently used data transmission path from the first transmission path to the second transmission path. Correspondingly, the first condition further includes: the terminal determines, based on the switching preference setting option, that the user allows the terminal to, if a specific application runs on the terminal and when there is a second transmission path corresponding to a wireless fidelity Wi-Fi network, switch the currently used data transmission path from the first transmission path to the second transmission path.

The switching preference setting option is set to determine, if a specific application runs on the terminal and when there is a second transmission path corresponding to a Wi-Fi network, whether to switch the currently used data transmission path from the first transmission path to the second transmission path. It should be noted that the determining process may be performed before whether a connection has been established between the specific application and the corresponding server is determined, or may be performed after whether a connection has been established between the specific application and the corresponding server is determined. If the switching preference setting option indicates to, if a specific application runs on the terminal and when there is a second transmission path corresponding to a Wi-Fi network, switch the currently used data transmission path from the first transmission path to the second transmission path, whether a connection has been established between the specific application and the corresponding server may be further determined. If the switching preference setting option indicates not to, if a specific application runs on the terminal and when there is a second transmission path corresponding to a Wi-Fi network, switch the currently used data transmission path from the first transmission path to the second transmission path, whether a connection has been established between the specific application and the corresponding server does not need to be further determined, to reduce power consumption of the terminal.

It can be learned that, according to the transmission path switching method provided in this embodiment of this application, when the terminal determines that the second TCP connection is being established or has been established between the specific application and the corresponding server, the terminal switches the currently used data transmission path from the first transmission path to the second transmission path, or sets a default transmission path used to transmit data as the second transmission path. In this way, a switching delay of the terminal in a switching process can be reduced.

Figure 5:
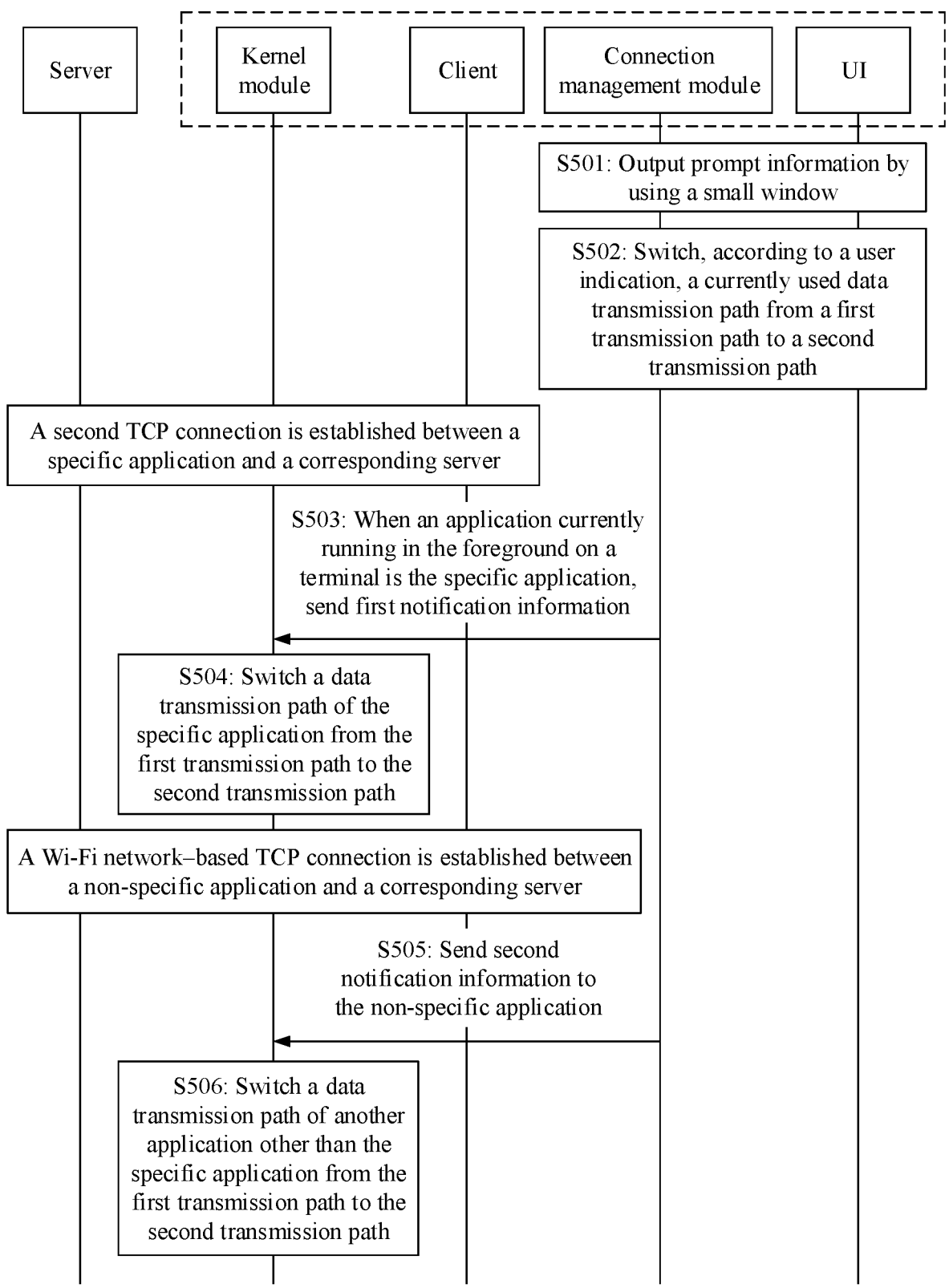
FIG. 5 is a schematic flowchart of another transmission path switching method according to an embodiment of this application.

In the embodiment shown in FIG. 4, the technical solution in which the terminal switches the currently used data transmission path from the first transmission path to the second transmission path when the second TCP connection is being established or has been established between the specific application and the corresponding server is described in detail. Based on the embodiment shown in FIG. 4, how the terminal switches the currently used data transmission path from the first transmission path to the second transmission path after determining to switch the currently used data transmission path from the first transmission path to the second transmission path is further described in detail in an embodiment shown in FIG. 5. For example, referring to FIG. 5, FIG. 5 is a schematic flowchart of another transmission path switching method according to an embodiment of this application. The transmission path switching method may include the following steps.

S501: The terminal outputs prompt information by using a small window.

The prompt information is used by the user to determine whether to switch the currently used data transmission path from the first transmission path to the second transmission path.

S502: The terminal determines, according to a user indication, to switch the currently used data transmission path from the first transmission path to the second transmission path.

It should be noted that, in this embodiment of this application, S501 and S502 are performed after S402, namely, when the second TCP connection is being established or has been established between the specific application and the corresponding server, the kernel module of the terminal determines to switch the currently used data transmission path from the first transmission path to the second transmission path. It may be understood that S501 and S502 may also be performed after S402. To be specific, after the connection management module of the terminal detects the stored wireless fidelity Wi-Fi network and configures the second transmission path corresponding to the Wi-Fi network, S501 and S502 are performed. If S501 and S502 indicate to switch the currently used data transmission path from the first transmission path to the second transmission path, S402 is performed. If S501 and S502 indicate not to switch the currently used data transmission path from the first transmission path to the second transmission path, S402 does not need to be performed.

It may be understood that, in a data transmission path switching process, to ensure normal switching of a specific application currently running in the foreground, a data transmission path of the specific application may be first switched from the first transmission path to the second transmission path, and then a data transmission path of another application other than the specific application is switched from the first transmission path to the second transmission path, in other words, the following S303 to S306 are performed. Certainly, the data transmission paths of the specific application and the another application other than the specific application may alternatively be switched from the first transmission path to the second transmission path at the same time. In this embodiment of this application, that the data transmission path of the specific application is first switched from the first transmission path to the second transmission path, and then the data transmission path of the another application other than the specific application is switched from the first transmission path to the second transmission path is merely used as an example for description. However, this does not mean that this embodiment of this application is limited thereto.

S503: If the Wi-Fi network meets the first condition, the terminal sends first notification information to the specific application after the second transmission path is configured.

The first notification information is used to notify the specific application that a network status changes. It should be noted that, that notifying the specific application that the network status changes may specifically be: notifying the specific application that a mobile network connection is now disconnected and a Wi-Fi network connection is now established (although the mobile network connection has not been disconnected actually and the Wi-Fi network connection has not been established yet).

S504: After the terminal sends the first notification information to the specific application, in other words, after the second module of the terminal sends the first notification information to the specific application, the terminal switches the data transmission path of the specific application from the first transmission path to the second transmission path.

S505: The terminal sends second notification information to the another application other than the specific application.

The second notification information is used to notify the another application that a network status changes. It may also be noted that, that notifying the another application that the network status changes may specifically be: notifying the another application that a mobile network connection is now disconnected and a Wi-Fi network connection is now established (actually, the mobile network connection has been disconnected and the Wi-Fi network connection has been established).

S506: The terminal switches the data transmission path of the another application other than the specific application from first transmission path to the second transmission path after the terminal sends the second notification information to the another application.

It should be noted that, in this embodiment of this application, an implementation of S503 to S506 is similar to an implementation of S305 to S308 in the embodiment shown in FIG. 3B. For details, refer to related descriptions of S305 to S308 in the embodiment shown in FIG. 3B. Details are not described again in this embodiment of this application.

It should be noted that, in the foregoing embodiments, the methods and the steps that are implemented by the terminal may also be implemented by a component (for example, a chip or a circuit) that may be used in the terminal.

An embodiment of this application further provides a menu option setting method, applied to a terminal. A menu option includes a switching preference setting option. A data transmission path currently used by the terminal is a first transmission path corresponding to a mobile network. The menu option setting method may include:

the switching preference setting option is used by a user to, if a specific application runs on the terminal and when there is a second transmission path corresponding to a wireless fidelity Wi-Fi network, set whether the terminal is allowed to switch the currently used data transmission path from the first transmission path to the second transmission path.

Optionally, the switching preference setting option is set in a setting menu option of the terminal, or the switching preference setting option is set in a setting menu option of an assistant application of an application. Specifically, the switching preference setting option may be set according to an actual requirement. In this embodiment of this application, that the switching preference setting option is set in the setting menu option of the terminal or in the setting menu option of the assistant application of the application is merely used as an example for description. However, this does not mean that this embodiment of this application is limited thereto.

Optionally, if the switching preference setting option is set to enabled, and when the terminal has established the second transmission path, the terminal switches the currently used data transmission path from the first transmission path to the second transmission path; or if the switching preference setting option is set to disabled, the terminal does not switch the currently used data transmission path from the first transmission path to the second transmission path.

Optionally, when the switching preference setting option indicates, by using a pop-up window, that there is an available Wi-Fi network, and the user chooses, by using the pop-up window, to perform network switching, the terminal switches the currently used data transmission path from the first transmission path to the second transmission path. When the switching preference setting option indicates, by using a pop-up window, that there is an available Wi-Fi network, and the user chooses, by using the pop-up window, not to perform network switching, the terminal does not switch the currently used data transmission path from the first transmission path to the second transmission path.

It can be learned that in this embodiment of this application, the switching preference setting option is set, so that whether to perform data transmission path switching can be determined based on an actual requirement or preference of the user, in other words, based on the actual requirement or preference of the user. This improves use smoothness of an application, and improves user experience.

Figure 6:
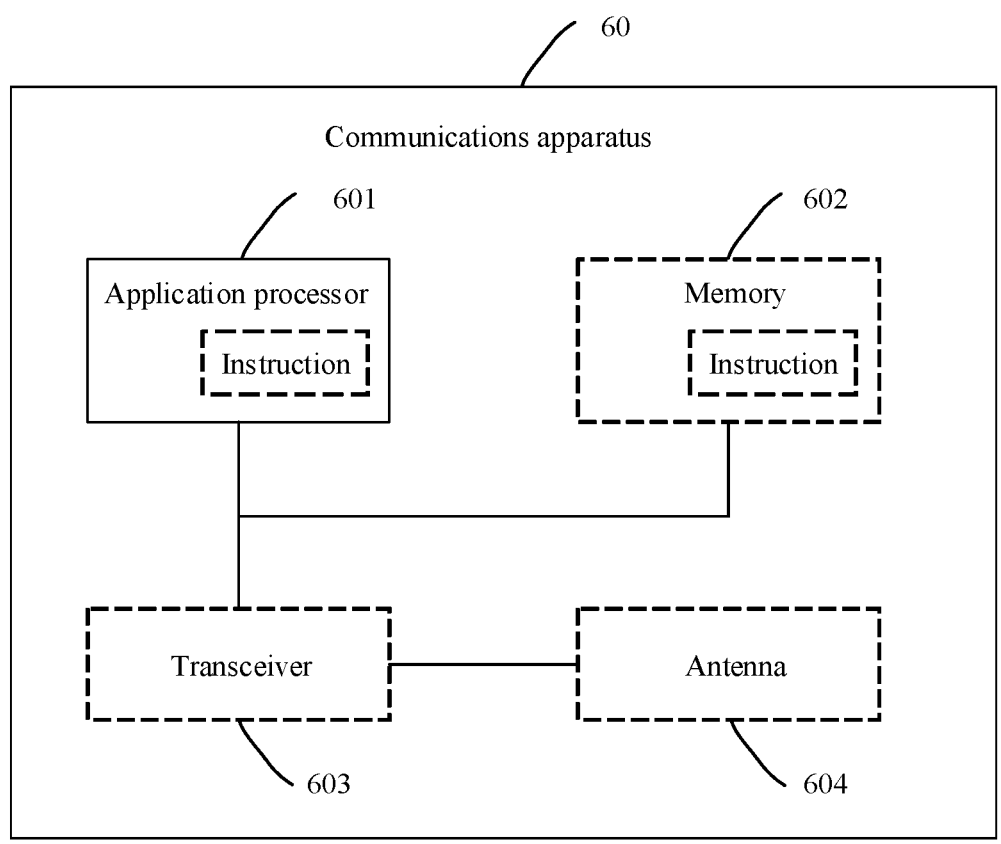
FIG. 6 is a schematic diagram of a structure of a communications apparatus according to an embodiment of this application.

FIG. 6 is a schematic diagram of a structure of a communications apparatus 60 according to an embodiment of this application. For example, referring to FIG. 6, the communications apparatus 60 in this embodiment may be the terminal (or the component that may be used in the terminal) mentioned in the foregoing method embodiments. The communications apparatus 60 may be configured to implement the method that corresponds to the terminal device and that is described in the foregoing method embodiments. For details, refer to the descriptions in the foregoing method embodiments.

The communications apparatus 60 may include one or more application processors 601. The application processor 601 may also be referred to as a processing unit, and may implement a specific control or processing function. The application processor 601 may be a general purpose processor, a dedicated processor, or the like, for example, may be a baseband processor or a central processing unit. The baseband processor may be configured to process a communications protocol and communication data. The central processing unit may be configured to control the communications apparatus 60, execute a software program, and process data of the software program.

In an optional design, the application processor 601 may also store an instruction or data (for example, intermediate data). The instruction may be run by the application processor 601, so that the communications apparatus 60 performs the method that corresponds to the terminal device and that is described in the foregoing method embodiments.

In another possible design, the communications apparatus 60 may include a circuit, and the circuit may implement a transmitting, receiving, or communication function in the foregoing method embodiments.

Optionally, the communications apparatus 60 may include one or more memories 602 that may store an instruction. The instruction may be run on the application processor 601, so that the communications apparatus 60 performs the methods described in the foregoing method embodiments.

Optionally, the memory 602 may also store data. The application processor 601 and the memory 602 may be disposed separately, or may be integrated together.

Optionally, the communications apparatus 60 may further include a transceiver 603 and/or an antenna 604. The application processor 601 may be referred to as a processing unit, and controls the communications apparatus 60 (a terminal device or a network device). The transceiver 603 may be referred to as a transceiver unit, a transceiver machine, a transceiver circuit, an input/output interface, or the like, and is configured to implement receiving and transmitting functions of the communications apparatus 60.

For specific implementation processes of the transceiver 603 and the application processor 601, refer to related descriptions in the foregoing method embodiments. Details are not described herein again.

The application processor 601 may configure, after a stored wireless fidelity Wi-Fi network is detected by a Wi-Fi communications module, a second transmission path corresponding to the Wi-Fi network, and switch, if the Wi-Fi network meets a first condition, a currently used data transmission path from a first transmission path to the second transmission path.

The first condition is related to one or more of the following parameters: signal strength of the Wi-Fi network, signal quality of the Wi-Fi network, duration of the signal strength of the Wi-Fi network, duration of the signal quality of the Wi-Fi network, whether the Wi-Fi network requires secondary authentication, whether data can be transmitted by using the second transmission path, and a rate at which data can be transmitted by using the second transmission path.

Optionally, the application processor 601 may further determine whether the Wi-Fi network meets the first condition.

That the application processor 601 may further determine whether the Wi-Fi network meets the first condition includes:

if an application currently running in the foreground on the terminal is a specific application, the application processor 601 may determine whether the Wi-Fi network meets the first condition.

Optionally, a corresponding first condition when the application currently running in the foreground on the terminal is a non-specific application is different from a corresponding first condition when the application currently running in the foreground on the terminal is a specific application.

Optionally, the first condition includes at least one of the following:

the signal strength of the Wi-Fi network is greater than a first threshold; or the signal strength of the Wi-Fi network is greater than the first threshold, and duration in which the signal strength of the Wi-Fi network is greater than the first threshold is greater than a second threshold; or the signal quality of the Wi-Fi network meets a third condition; or the signal quality of the Wi-Fi network meets a third condition, and duration in which the signal quality of the Wi-Fi network meets the third condition is greater than a third threshold; or the Wi-Fi network does not require secondary authentication; or data can be transmitted by using the second transmission path; or data can be transmitted by using second transmission path, and a transmission rate is greater than a fourth threshold.

Optionally, a first TCP connection is established between the specific application and a server corresponding to the specific application, and data of the specific application related to the first TCP connection is transmitted by using the first transmission path. The application processor 601 includes a first module and a second module. That the application processor 601 switches the currently used data transmission path from the first transmission path to the second transmission path includes:

the first module of the application processor 601 may receive indication information from the second module of the terminal, where the indication information is used to switch the currently used data transmission path from the first transmission path to the second transmission path when the terminal determines that a second TCP connection is being established or has been established between the specific application and the corresponding server, where the second TCP connection is different from the first TCP connection; and the application processor 601 may switch the currently used data transmission path from the first transmission path to the second transmission path according to the indication information, so that data of the specific application related to the second TCP connection is transmitted by using the second transmission path.

Optionally, the application processor 601 may not configure, after the stored wireless fidelity Wi-Fi network is detected by the Wi-Fi communications module, and if the terminal determines that the Wi-Fi network requires secondary authentication, the second transmission path corresponding to the Wi-Fi network.

Optionally, the application processor 601 may further send first notification information to the specific application after the second transmission path is configured. The first notification information is used to notify the specific application that a network status changes.

That the application processor 601 may switch the currently used data transmission path from the first transmission path to the second transmission path according to the indication information includes: the application processor 601 may switch the currently used data transmission path from the first transmission path to the second transmission path according to the indication information after the application processor sends the first notification information to the specific application.

Optionally, that the application processor 601 switches the data transmission path of the specific application from the first transmission path to the second transmission path after sending the first notification information to the specific application includes:

after the application processor 601 sends the first notification information to the specific application, and after the specific application sends, by using the first module of the terminal and based on the first notification information, a TCP connection establishment request used to establish the second TCP connection to the server corresponding to the specific application, and the first module of the terminal receives the TCP connection establishment request, the application processor switches the data transmission path of the specific application from the first transmission path to the second transmission path.

Optionally, the application processor 601 may further send second notification information to another application other than the specific application after switching the data transmission path of the specific application from the first transmission path to the second transmission path. The second notification information is used to notify the another application that a network status changes.

The application processor 601 switches a data transmission path of the another application other than the specific application from the first transmission path to the second transmission path after sending the second notification information to the another application.

Optionally, that the application processor 601 switches the data transmission path of the another application other than the specific application from the first transmission path to the second transmission path after sending the second notification information to the another application includes:

after the application processor 601 sends the second notification information to the another application, and after the another application sends, by using the first module of the terminal and based on the second notification information, a TCP connection establishment request used to establish a Wi-Fi network-based TCP connection to a server corresponding to the another application, and the first module of the terminal receives the TCP connection establishment request, the application processor switches the data transmission path of the another application from the first transmission path to the second transmission path.

The application processor 601 and the transceiver 603 described in this application may be implemented on an integrated circuit (IC), an analog IC, a radio frequency integrated circuit (RFIC), a mixed signal IC, an application-specific integrated circuit (ASIC), a printed circuit board (PCB), an electronic device, and the like. The application processor 601 and the transceiver 603 may also be manufactured by using various 1C technologies, for example, a complementary metal oxide semiconductor (CMOS), an n-type metal oxide semiconductor (NMOS), a p-channel metal oxide semiconductor (PMOS), a bipolar junction transistor (BJT), a bipolar CMOS (BiCMOS), silicon germanium (SiGe), and gallium arsenide (GaAs).

Although the communications apparatus 60 is described by using the terminal device or the network device as an example in the description of the foregoing embodiment, a range of the communications apparatus 60 described in this application is not limited to the foregoing terminal device or the foregoing network device, and the structure of the communications apparatus 60 may not be limited by FIG. 6. The communications apparatus 60 may be an independent device or may be a part of a relatively large device. For example, the device may be:

(1) an independent integrated circuit (IC), a chip, a chip system, or a subsystem;

(2) a set including one or more ICs, where optionally, the IC set may further include a storage component configured to store data and/or an instruction;

(3) an ASIC, for example, a modem (MSM);

(4) a module that can be built in another device;

(5) a receiver, a terminal device, a cellular phone, a wireless device, a hand-held phone, a mobile unit, or a network device; or (6) another device.

Figure 7:
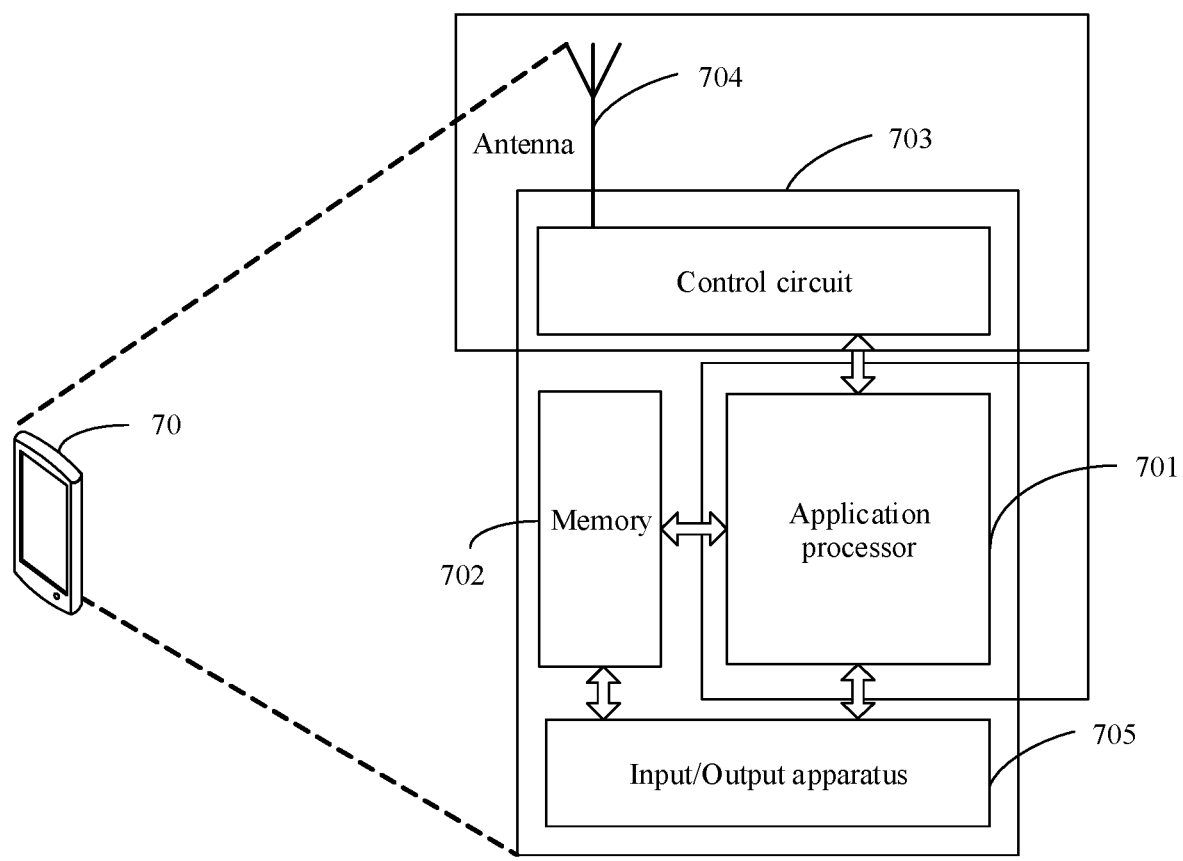
FIG. 7 is a schematic diagram of a structure of a terminal according to an embodiment of this application.

FIG. 7 is a schematic diagram of a structure of a terminal 70 according to an embodiment of this application. The terminal 70 is applicable to the terminal 70 described in the foregoing embodiments of this application. For ease of description, FIG. 7 shows only main components of the terminal 70. For example, referring to FIG. 7, the terminal 70 includes an application processor 701, a memory 702, a control circuit 703, an antenna 704, and an input/output apparatus 705. The application processor 701 is mainly configured to process a communication protocol and communication data, control the entire terminal 70, execute a software program, and process data of the software program. The memory 702 is mainly configured to store a software program and data. A radio frequency circuit is mainly configured to perform conversion between a baseband signal and a radio frequency signal, and process the radio frequency signal. The antenna 704 is mainly configured to receive and send a radio frequency signal in a form of electromagnetic wave. The input/output apparatus 705, for example, a touchscreen, a display screen, or a keyboard, is mainly configured to receive data entered by a user and output data to the user.

After the terminal 70 is powered on, the application processor 701 may read a software program in a storage unit, interpret and execute an instruction of the software program, and process data of the software program. When data needs to be sent in a wireless manner, the application processor 701 performs baseband processing on to-be-sent data, and then outputs a baseband signal to the radio frequency circuit. The radio frequency circuit performs radio frequency processing on the baseband signal, and then sends a radio frequency signal in a form of electromagnetic wave by using the antenna 704. When there is data sent to the terminal 70, the radio frequency circuit receives the radio frequency signal by using the antenna 704, converts the radio frequency signal into a baseband signal, and outputs the baseband signal to the application processor 701. The application processor 701 converts the baseband signal into data, and processes the data.

A person skilled in the art may understand that, for ease of description, FIG. 7 shows only one memory 702 and only one application processor 701. In an actual terminal 70, there may be a plurality of application processors 701 and a plurality of memories 702. The memory 702 may also be referred to as a storage medium, a storage device, or the like. This is not limited in this embodiment of this application.

In an optional implementation, the processor may include a baseband processor and a central processing unit. The baseband processor is mainly configured to process a communication protocol and communication data, and the central processing unit is mainly configured to control the entire terminal 70, execute a software program, and process data of the software program. The application processor 701 in FIG. 7 integrates functions of the baseband processor and the central processing unit. A person skilled in the art may understand that the baseband processor and the central processing unit may alternatively be independent application processors 701, and are interconnected by using a technology such as a bus. A person skilled in the art may understand that the terminal 70 may include a plurality of baseband processors to adapt to different network standards, and the terminal 70 may include a plurality of central processing units to enhance a processing capability of the terminal 70. The components of the terminal 70 may be connected by using various buses. The baseband processor may also be expressed as a baseband processing circuit or a baseband processing chip. The central processing unit may also be expressed as a central processing circuit or a central processing chip. A function of processing the communications protocol and the communication data may be configured in the processor 701, or may be stored in the storage unit in a form of software program. The application processor 701 executes the software program to implement a baseband processing function.

Figure 8:
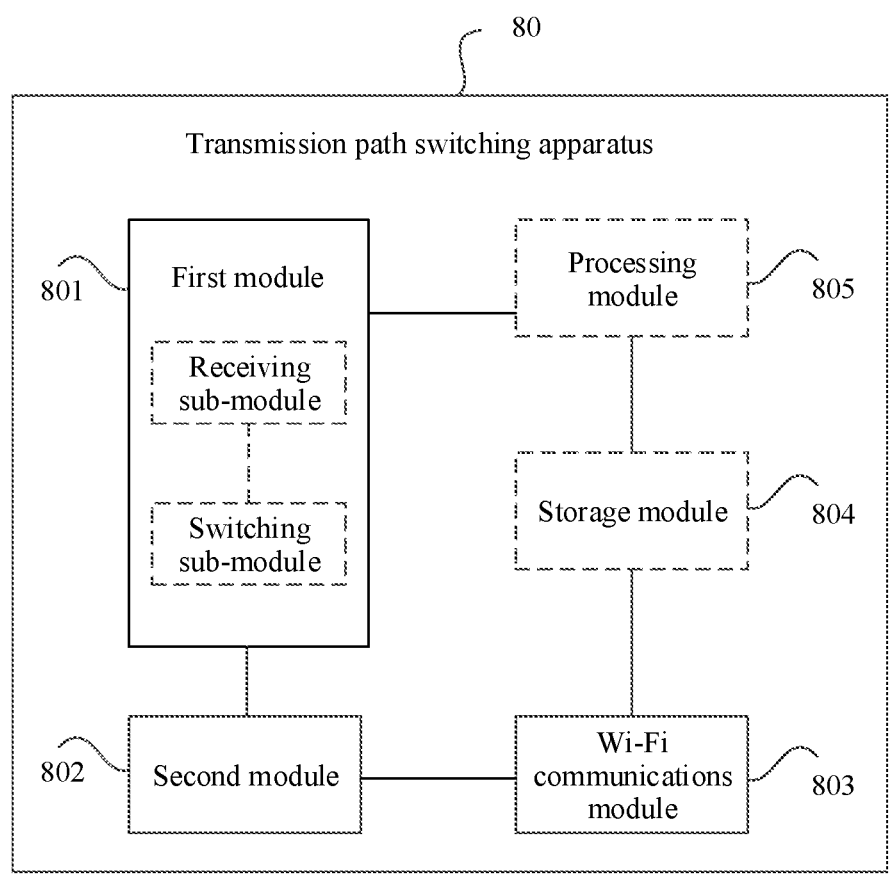
FIG. 8 is a schematic diagram of a transmission path switching apparatus according to an embodiment of this application.

FIG. 8 is a schematic diagram of a transmission path switching apparatus 80 according to an embodiment of this application. The transmission path switching apparatus is applied to a terminal. A data transmission path currently used by the terminal is a first transmission path corresponding to a mobile network. For example, referring to FIG. 8, the transmission path switching apparatus 80 may include a first module 801, a second module 802 and a Wi-Fi communications module 803.

The second module 802 is configured to, after a stored wireless fidelity Wi-Fi network is detected by the Wi-Fi communications module 803, configure a second transmission path corresponding to the Wi-Fi network.

The first module 801 is configured to, if the Wi-Fi network meets a first condition, switch the currently used data transmission path from the first transmission path to the second transmission path.

The first condition is related to one or more of the following parameters: signal strength of the Wi-Fi network, signal quality of the Wi-Fi network, duration of the signal strength of the Wi-Fi network, duration of the signal quality of the Wi-Fi network, whether the Wi-Fi network requires secondary authentication, whether data can be transmitted by using the second transmission path, and a rate at which data can be transmitted by using the second transmission path.

Optionally, the first module 801 is further configured to determine whether the Wi-Fi network meets the first condition.

That the first module 801 is further configured to determine whether the Wi-Fi network meets the first condition includes:

if an application currently running in the foreground on the terminal is a specific application, the first module 801 is configured to determine whether the Wi-Fi network meets the first condition.

Optionally, a corresponding first condition when the application currently running in the foreground on the terminal is a non-specific application is different from a corresponding first condition when the application currently running in the foreground on the terminal is a specific application.

Optionally, the first condition includes at least one of the following:

the signal strength of the Wi-Fi network is greater than a first threshold; or the signal strength of the Wi-Fi network is greater than the first threshold, and duration in which the signal strength of the Wi-Fi network is greater than the first threshold is greater than a second threshold; or the signal quality of the Wi-Fi network meets a third condition; or the signal quality of the Wi-Fi network meets a third condition, and duration in which the signal quality of the Wi-Fi network meets the third condition is greater than a third threshold; or the Wi-Fi network does not require secondary authentication; or data can be transmitted by using the second transmission path; or data can be transmitted by using second transmission path, and a transmission rate is greater than a fourth threshold.

Optionally, a first TCP connection is established between the specific application and a server corresponding to the specific application, and data of the specific application related to the first TCP connection is transmitted by using the first transmission path. The first module 801 includes a receiving sub-module and a switching sub-module. That the first module 801 is configured to switch the currently used data transmission path from the first transmission path to the second transmission path includes:

the receiving sub-module is configured to receive indication information from the second module 802, where the indication information is used to switch the currently used data transmission path from the first transmission path to the second transmission path when the terminal determines that a second TCP connection is being established or has been established between the specific application and the corresponding server, where the second TCP connection is different from the first TCP connection; and the switching sub-module is configured to switch the currently used data transmission path from the first transmission path to the second transmission path according to the indication information, so that data of the specific application related to the second TCP connection is transmitted by using the second transmission path.

Optionally, that the second module 802 is configured to, after the stored wireless fidelity Wi-Fi network is detected by the Wi-Fi communications module 803, configure the second transmission path corresponding to the Wi-Fi network includes:

the second module 802 is configured to, after the stored wireless fidelity Wi-Fi network is detected by the Wi-Fi communications module 803, and if the Wi-Fi network does not require secondary authentication, configure the second transmission path corresponding to the Wi-Fi network.

It should be noted that, in this embodiment of this application, whether the Wi-Fi network requires secondary authentication may be determined by a user, the Wi-Fi communications module 803, or a second module 802 that may be specifically set according to an actual requirement. This is not specifically limited in this embodiment of this application.

Optionally, the second module 802 is further configured not to, after the stored wireless fidelity Wi-Fi network is detected by the Wi-Fi communications module 803, and if the Wi-Fi network requires secondary authentication, configure the second transmission path corresponding to the Wi-Fi network.

Optionally, the transmission path switching apparatus further includes a storage module 804.

The storage module 804 is configured to store information about whether the Wi-Fi network requires secondary authentication.

Optionally, the second module 802 is further configured to send first notification information to the specific application after the second transmission path is configured. The first notification information is used to notify the specific application that a network status changes.

The switching sub-module is specifically configured to switch a data transmission path of the specific application from the first transmission path to the second transmission path according to the indication information after the second module 802 sends the first notification information to the specific application.

Optionally, that the switching sub-module is configured to switch the data transmission path of the specific application from the first transmission path to the second transmission path according to the indication information after the second module 802 sends the first notification information to the specific application includes:

after the second module 802 sends the first notification information to the specific application, and after the specific application sends, by using the first module 801 of the terminal and based on the first notification information, a TCP connection establishment request used to establish the second TCP connection to the server corresponding to the specific application, and the first module 801 of the terminal receives the TCP connection establishment request, the switching sub-module is configured to switch the data transmission path of the specific application from the first transmission path to the second transmission path.

Optionally, the second module 802 is further configured to send second notification information to another application other than the specific application after the switching sub-module switches the data transmission path of the specific application from the first transmission path to the second transmission path. The second notification information is used to notify the another application that a network status changes.

The switching sub-module is further configured to switch a data transmission path of the another application other than the specific application from the first transmission path to the second transmission path after the second module 802 sends the second notification information to the another application.

Optionally, that the switching sub-module is further configured to switch the data transmission path of the another application other than the specific application from the first transmission path to the second transmission path after the second module 802 sends the second notification information to the another application includes:

after the second module 802 sends the second notification information to the another application, and after the another application sends, by using the first module 801 of the terminal and based on the second notification information, a TCP connection establishment request used to establish a Wi-Fi network-based TCP connection to a server corresponding to the another application, and the first module 801 of the terminal receives the TCP connection establishment request, the switching sub-module is configured to switch the data transmission path of the another application from the first transmission path to the second transmission path.

Optionally, a menu option of the terminal includes a switching preference setting option, and the switching preference setting option is used by a user to, if a specific application runs on the terminal and when there is a second transmission path corresponding to a wireless fidelity Wi-Fi network, set whether the terminal is allowed to switch the currently used data transmission path from the first transmission path to the second transmission path.

The first condition further includes: the terminal determines, based on the switching preference setting option, that the user allows the terminal to, if a specific application runs on the terminal and when there is a second transmission path corresponding to a wireless fidelity Wi-Fi network, switch the currently used data transmission path from the first transmission path to the second transmission path.

Optionally, the transmission path switching apparatus further includes a processing module 805.

The processing module 805 is configured to output prompt information by using a small window. The prompt information is used by the user to determine whether to switch the currently used data transmission path from the first transmission path to the second transmission path.

The first module 801 is further configured to determine, according to a user indication, to switch the currently used data transmission path from the first transmission path to the second transmission path.

Optionally, the specific application is an online game application and/or a video live broadcast application.

Optionally, the first notification information includes a current status of the mobile network and a current status of the Wi-Fi network.

Optionally, the second notification information includes a current status of the mobile network and a current status of the Wi-Fi network.

Optionally, the first module 801 is a kernel module, and the second module 802 is a connection management module.

Optionally, the first module 801, the second module 802, and the processing module 805 in the embodiment shown in FIG. 8 may be the processor in the embodiment shown in FIG. 6, in other words, the processor may execute operations corresponding to the first module 801, the second module 802, and the processing module 805. The processor may also be referred to as a processing unit, and may implement a specific control or processing function. The processor may be a general purpose processor, a dedicated processor, or the like, for example, may be a baseband processor or a central processing unit. The baseband processor may be configured to process a communications protocol and communication data. The central processing unit may be configured to control the communications apparatus, execute a software program, and process data of the software program.

The transmission path switching apparatus 80 provided in this embodiment of this application may be configured to execute the technical solutions of the transmission path switching method embodiments shown in FIG. 2 to FIG. 5. An implementation principle and a technical effect of the transmission path switching apparatus are similar to implementation principles and technical effects in the method embodiments, and details are not described herein again.

Figure 9:
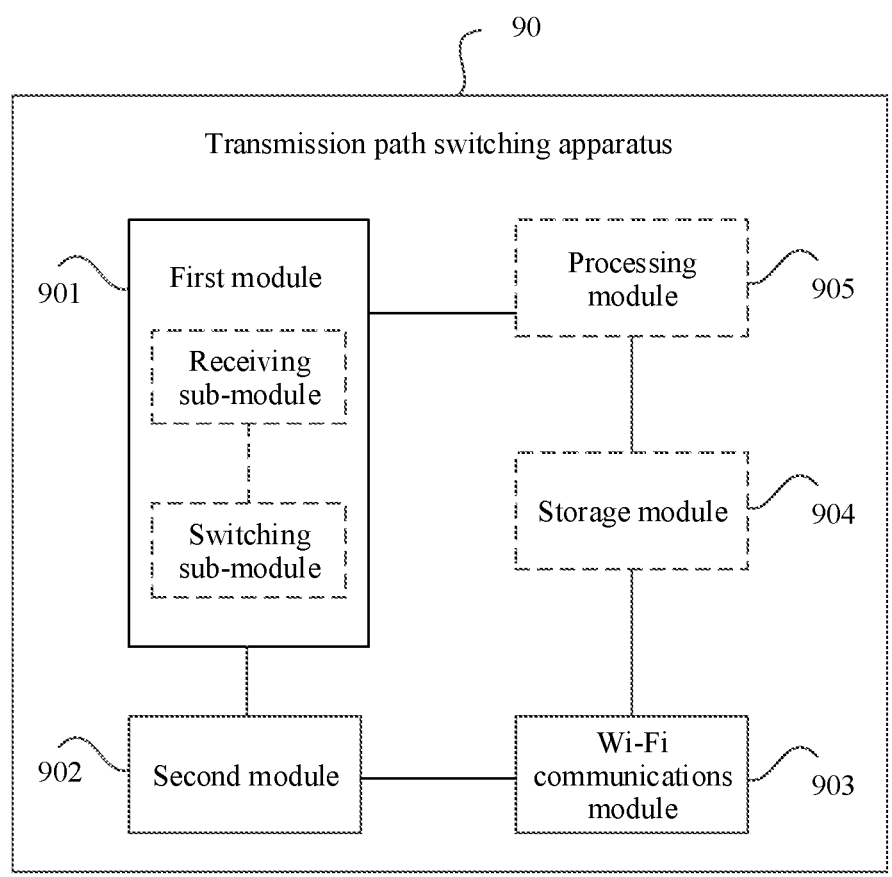
FIG. 9 is a schematic diagram of another transmission path switching apparatus according to an embodiment of this application.

FIG. 9 is a schematic diagram of another transmission path switching apparatus 90 according to an embodiment of this application. The transmission path switching apparatus is applied to a terminal. A data transmission path currently used by the terminal is a first transmission path corresponding to a mobile network. A first TCP connection is established between a specific application and a server corresponding to the specific application, and data of the specific application related to first TCP connection is transmitted by using the first transmission path. The transmission path switching apparatus 90 includes a first module 901, a second module 902, and a Wi-Fi communications module 903.

The second module 902 is configured to, after a stored wireless fidelity Wi-Fi network is detected by using the Wi-Fi communications module 903 of the terminal, configure a second transmission path corresponding to the Wi-Fi network.

The first module 901 is configured to switch the currently used data transmission path from the first transmission path to the second transmission path when a second TCP connection is being established or has been established between the specific application and the corresponding server, so that data of the specific application related to the second TCP connection is transmitted by using the second transmission path. The second TCP connection is different from the first TCP connection.

Optionally, the first module 901 includes a receiving sub-module and a switching sub-module. That the first module is 901 configured to switch the currently used data transmission path from the first transmission path to the second transmission path when the second TCP connection is being established or has been established between the specific application and the corresponding server includes:

the receiving sub-module is configured to receive indication information from the second module 902, where the indication information is used to indicate the terminal to switch the currently used data transmission path from the first transmission path to the second transmission path when the second TCP connection is being established or has been established between the specific application and the corresponding server; and the switching sub-module is configured to switch the currently used data transmission path from the first transmission path to the second transmission path according to the indication information when the second TCP connection is being established or has been established between the specific application and the corresponding server.

Optionally, that the first module 901 is configured to switch the currently used data transmission path from the first transmission path to the second transmission path when the second TCP connection is being established or has been established between the specific application and the corresponding server includes:

the first module 901 is configured to switch the currently used data transmission path from the first transmission path to the second transmission path when the Wi-Fi network meets a first condition and when the second TCP connection is being established or has been established between the specific application and the corresponding server.

The first condition is related to one or more of the following parameters: signal strength of the Wi-Fi network, signal quality of the Wi-Fi network, duration of the signal strength of the Wi-Fi network, duration of the signal quality of the Wi-Fi network, whether the Wi-Fi network requires secondary authentication, whether data can be transmitted by using the second transmission path, and a rate at which data can be transmitted by using the second transmission path.

Optionally, the first module 901 is further configured to determine whether the Wi-Fi network meets the first condition.

That the first module 901 is further configured to determine whether the Wi-Fi network meets the first condition includes:

if an application currently running in the foreground on the terminal is a specific application, the first module 901 is configured to determine whether the Wi-Fi network meets the first condition.

Optionally, a corresponding first condition when the application currently running in the foreground on the terminal is a non-specific application is different from a corresponding first condition when the application currently running in the foreground on the terminal is a specific application.

Optionally, the first condition includes at least one of the following:

the signal strength of the Wi-Fi network is greater than a first threshold; or the signal strength of the Wi-Fi network is greater than the first threshold, and duration in which the signal strength of the Wi-Fi network is greater than the first threshold is greater than a second threshold; or the signal quality of the Wi-Fi network meets a third condition; or the signal quality of the Wi-Fi network meets a third condition, and duration in which the signal quality of the Wi-Fi network meets the third condition is greater than a third threshold; or the Wi-Fi network does not require secondary authentication; or data can be transmitted by using the second transmission path; or data can be transmitted by using second transmission path, and a transmission rate is greater than a fourth threshold.

Optionally, that the second module 902 is configured to, after the stored wireless fidelity Wi-Fi network is detected by the Wi-Fi communications module 903, configure the second transmission path corresponding to the Wi-Fi network includes:

the second module 902 is configured to, after the stored wireless fidelity Wi-Fi network is detected by the Wi-Fi communications module 903, and if the Wi-Fi network does not require secondary authentication, configure the second transmission path corresponding to the Wi-Fi network.

It should be noted that, in this embodiment of this application, whether the Wi-Fi network requires secondary authentication may be determined by a user, the Wi-Fi communications module 903, or a second module 902 that may be specifically set according to an actual requirement. This is not specifically limited in this embodiment of this application.

Optionally, the second module 902 is further configured not to, after the stored wireless fidelity Wi-Fi network is detected by the Wi-Fi communications module 903, and if the Wi-Fi network requires secondary authentication, configure the second transmission path corresponding to the Wi-Fi network.

Optionally, the transmission path switching apparatus 90 further includes a storage module 904.

The storage module 904 is configured to store information about whether the Wi-Fi network requires secondary authentication.

Optionally, the second module 902 is further configured to send first notification information to the specific application after the second transmission path is configured. The first notification information is used to notify the specific application that a network status changes.

The switching sub-module is specifically configured to switch a data transmission path of the specific application from the first transmission path to the second transmission path according to the indication information after the second module 902 sends the first notification information to the specific application.

Optionally, that the switching sub-module is configured to switch the data transmission path of the specific application from the first transmission path to the second transmission path according to the indication information after the second module 902 sends the first notification information to the specific application includes:

after the second module 902 sends the first notification information to the specific application, and after the specific application sends, by using the first module 901 of the terminal and based on the first notification information, a TCP connection establishment request used to establish the second TCP connection to the server corresponding to the specific application, and the first module 901 of the terminal receives the TCP connection establishment request, the switching sub-module is configured to switch the data transmission path of the specific application from the first transmission path to the second transmission path.

Optionally, the second module 902 is further configured to send second notification information to another application other than the specific application after the switching sub-module switches the data transmission path of the specific application from the first transmission path to the second transmission path. The second notification information is used to notify the another application that a network status changes.

The switching sub-module is further configured to switch a data transmission path of the another application other than the specific application from the first transmission path to the second transmission path after the second module 902 sends the second notification information to the another application.

Optionally, that the switching sub-module is further configured to switch the data transmission path of the another application other than the specific application from the first transmission path to the second transmission path after the second module 902 sends the second notification information to the another application includes:

after the second module 902 sends the second notification information to the another application, and after the another application sends, by using the first module 901 of the terminal and based on the second notification information, a TCP connection establishment request used to establish a Wi-Fi network-based TCP connection to a server corresponding to the another application, and the first module 901 of the terminal receives the TCP connection establishment request, the switching sub-module is configured to switch the data transmission path of the another application from the first transmission path to the second transmission path.

Optionally, a menu option of the terminal includes a switching preference setting option, and the switching preference setting option is used by a user to, if a specific application runs on the terminal and when there is a second transmission path corresponding to a wireless fidelity Wi-Fi network, set whether the terminal is allowed to switch the currently used data transmission path from the first transmission path to the second transmission path.

The first condition further includes: the terminal determines, based on the switching preference setting option, that the user allows the terminal to, if a specific application runs on the terminal and when there is a second transmission path corresponding to a wireless fidelity Wi-Fi network, switch the currently used data transmission path from the first transmission path to the second transmission path.

Optionally, the transmission path switching apparatus 90 further includes a processing module 905.

The processing module 905 is configured to output prompt information by using a small window. The prompt information is used by the user to determine whether to switch the currently used data transmission path from the first transmission path to the second transmission path.

The first module 901 is further configured to determine, according to a user indication, to switch the currently used data transmission path from the first transmission path to the second transmission path.

Optionally, the specific application is an online game application and/or a video live broadcast application.

Optionally, the first notification information includes a current status of the mobile network and a current status of the Wi-Fi network.

Optionally, the second notification information includes a current status of the mobile network and a current status of the Wi-Fi network.

Optionally, the first module 901 is a kernel module, and the second module 902 is a connection management module.

Optionally, the second module 902, the first module 901, and the processing module 905 in the embodiment shown in FIG. 9 may be the processor in the embodiment shown in FIG. 6, in other words, the processor may execute operations corresponding to the second module 902, the first module 901, and the processing module 905. The processor may also be referred to as a processing unit, and may implement a specific control or processing function. The processor may be a general purpose processor, a dedicated processor, or the like, for example, may be a baseband processor or a central processing unit. The baseband processor may be configured to process a communications protocol and communication data. The central processing unit may be configured to control the communications apparatus, execute a software program, and process data of the software program.

The transmission path switching apparatus 90 provided in this embodiment of this application may be configured to execute the technical solutions of the transmission path switching method embodiments shown in FIG. 2 to FIG. 5. An implementation principle and a technical effect of the transmission path switching apparatus are similar to implementation principles and technical effects in the method embodiments, and details are not described herein again.

Figure 10:
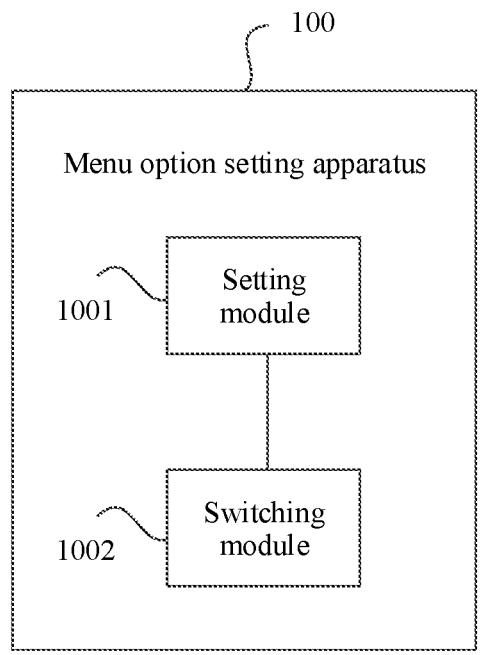
FIG. 10 is a schematic diagram of a menu option setting apparatus according to an embodiment of this application.

FIG. 10 is a schematic diagram of a menu option setting apparatus 100 according to an embodiment of this application. The menu option setting apparatus is applied to a terminal. A menu option includes a switching preference setting option. A data transmission path currently used by the terminal is a first transmission path corresponding to a mobile network. For example, referring to FIG. 10, the menu option setting apparatus 100 may include a setting module 1001 and a switching module 1002.

The setting module 1001 is configured to set the switching preference setting option. The switching preference setting option is used by a user to, if a specific application runs on the terminal and when there is a second transmission path corresponding to a wireless fidelity Wi-Fi network, set whether the switching module 1002 is allowed to switch the currently used data transmission path from the first transmission path to the second transmission path.

Optionally, the switching preference setting option is set in a setting menu option of the terminal, or the switching preference setting option is set in a setting menu option of an assistant application of an application.

Optionally, if the switching preference setting option is set to enabled, and when the terminal has established the second transmission path, the switching module 1002 is configured to switch the currently used data transmission path from the first transmission path to the second transmission path; or if the switching preference setting option is set to disabled, the switching module does not switch the currently used data transmission path from the first transmission path to the second transmission path.

Optionally, when the switching preference setting option indicates, by using a pop-up window, that there is an available Wi-Fi network, and the user chooses, by using the pop-up window, to perform network switching, the switching module 1002 is further configured to switch the currently used data transmission path from the first transmission path to the second transmission path; and when the switching preference setting option indicates, by using a pop-up window, that there is an available Wi-Fi network, and the user chooses, by using the pop-up window, not to perform network switching, the switching module does not switch the currently used data transmission path from the first transmission path to the second transmission path.

Optionally, the setting module 1001 and the switching module 1002 in the embodiment shown in FIG. 10 may be the processor in the embodiment shown in FIG. 6, in other words, the processor may execute operations corresponding to the setting module 1001 and the switching module 1002. The processor may also be referred to as a processing unit, and may implement a specific control or processing function. The processor may be a general purpose processor, a dedicated processor, or the like, for example, may be a baseband processor or a central processing unit. The baseband processor may be configured to process a communications protocol and communication data. The central processing unit may be configured to control the communications apparatus, execute a software program, and process data of the software program.

The menu option setting apparatus 100 provided in this embodiment of this application may be configured to execute the technical solutions of the menu option setting method embodiments shown in FIG. 2 to FIG. 5. An implementation principle and a technical effect of the menu option setting apparatus are similar to implementation principles and technical effects in the method embodiments, and details are not described herein again.

Figure 11:
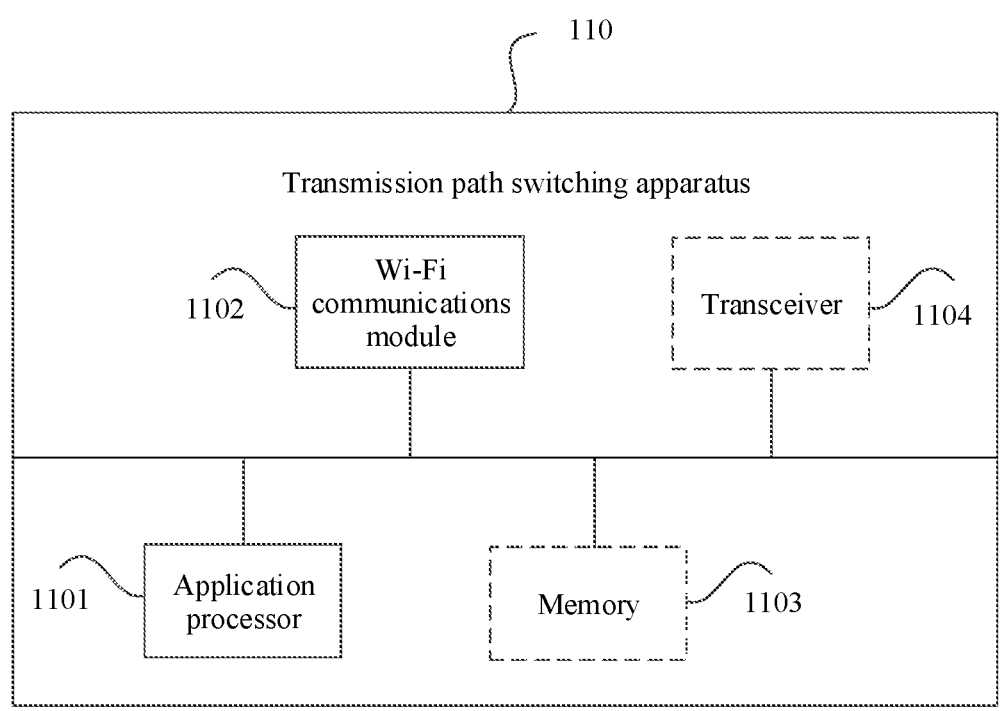
FIG. 11 is a schematic diagram of a transmission path switching apparatus according to an embodiment of this application.

FIG. 11 is a schematic diagram of a transmission path switching apparatus 110 according to an embodiment of this application. The transmission path switching apparatus is applied to a terminal. A data transmission path currently used by the terminal is a first transmission path corresponding to a mobile network. The transmission path switching apparatus 110 includes an application processor 1101 and a Wi-Fi communications module 1102.

The application processor 1101 is configured to: after a stored wireless fidelity Wi-Fi network is detected by the Wi-Fi communications module 1102, configure a second transmission path corresponding to the Wi-Fi network; and if the Wi-Fi network meets a first condition, switch the currently used data transmission path from the first transmission path to the second transmission path.

The first condition is related to one or more of the following parameters: signal strength of the Wi-Fi network, signal quality of the Wi-Fi network, duration of the signal strength of the Wi-Fi network, duration of the signal quality of the Wi-Fi network, whether the Wi-Fi network requires secondary authentication, whether data can be transmitted by using the second transmission path, and a rate at which data can be transmitted by using the second transmission path.

Optionally, the application processor 1101 is further configured to determine whether the Wi-Fi network meets the first condition.

That the application processor 1101 is further configured to determine whether the Wi-Fi network meets the first condition includes:

if an application currently running in the foreground on the terminal is a specific application, the application processor 1101 is configured to determine whether the Wi-Fi network meets the first condition.

Optionally, a corresponding first condition when the application currently running in the foreground on the terminal is a non-specific application is different from a corresponding first condition when the application currently running in the foreground on the terminal is a specific application.

Optionally, the first condition includes at least one of the following:

the signal strength of the Wi-Fi network is greater than a first threshold; or the signal strength of the Wi-Fi network is greater than the first threshold, and duration in which the signal strength of the Wi-Fi network is greater than the first threshold is greater than a second threshold; or the signal quality of the Wi-Fi network meets a third condition; or the signal quality of the Wi-Fi network meets a third condition, and duration in which the signal quality of the Wi-Fi network meets the third condition is greater than a third threshold; or the Wi-Fi network does not require secondary authentication; or data can be transmitted by using the second transmission path; or data can be transmitted by using second transmission path, and a transmission rate is greater than a fourth threshold.

Optionally, a first TCP connection is established between the specific application and a server corresponding to the specific application, and data of the specific application related to the first TCP connection is transmitted by using the first transmission path. The application processor 1101 includes a first module and a second module. That the application processor 1101 is configured to switch the currently used data transmission path from the first transmission path to the second transmission path includes:

the first module is configured to receive indication information from the second module of the terminal, where the indication information is used to switch the currently used data transmission path from the first transmission path to the second transmission path when the terminal determines that a second TCP connection is being established or has been established between the specific application and the corresponding server, where the second TCP connection is different from the first TCP connection; and the application processor 1101 is configured to switch the currently used data transmission path from the first transmission path to the second transmission path according to the indication information, so that data of the specific application related to the second TCP connection is transmitted by using the second transmission path.

Optionally, the application processor 1101 is further configured to determine whether the Wi-Fi network requires secondary authentication.

That the application processor 1101 is configured to configure the second transmission path corresponding to the Wi-Fi network includes:

the application processor 1101 is configured to, if the Wi-Fi network does not require secondary authentication, configure the second transmission path corresponding to the Wi-Fi network.

Optionally, the application processor 1101 is further configured not to, after the stored wireless fidelity Wi-Fi network is detected by the Wi-Fi communications module 1102, and if the Wi-Fi network requires secondary authentication, configure the second transmission path corresponding to the Wi-Fi network.

Optionally, the transmission path switching apparatus further includes a memory 1103.

The memory 1103 is configured to store information about whether the Wi-Fi network requires secondary authentication.

Optionally, the application processor 1101 is further configured to send first notification information to the specific application after the second transmission path is configured. The first notification information is used to notify the specific application that a network status changes.

That the application processor 1101 is configured to switch the currently used data transmission path from the first transmission path to the second transmission path according to the indication information includes: the application processor 1101 is configured to switch a data transmission path of the specific application from the first transmission path to the second transmission path according to the indication information after the application processor 1101 sends the first notification information to the specific application.

Optionally, that the application processor 1101 switches the data transmission path of the specific application from the first transmission path to the second transmission path after sending the first notification information to the specific application includes:

after the application processor 1101 sends the first notification information to the specific application, and after the specific application sends, by using the first module of the terminal and based on the first notification information, a TCP connection establishment request used to establish the second TCP connection to the server corresponding to the specific application, and the first module of the terminal receives the TCP connection establishment request, the application processor switches the data transmission path of the specific application from the first transmission path to the second transmission path.

Optionally, the application processor 1101 is further configured to send second notification information to another application other than the specific application after switching the data transmission path of the specific application from the first transmission path to the second transmission path. The second notification information is used to notify the another application that a network status changes.

The application processor 1101 switches a data transmission path of the another application other than the specific application from the first transmission path to the second transmission path after sending the second notification information to the another application.

Optionally, that the application processor 1101 switches the data transmission path of the another application other than the specific application from the first transmission path to the second transmission path after sending the second notification information to the another application includes:

after the application processor 1101 sends the second notification information to the another application, and after the another application sends, by using the first module of the terminal and based on the second notification information, a TCP connection establishment request used to establish a Wi-Fi network-based TCP connection to a server corresponding to the another application, and the first module of the terminal receives the TCP connection establishment request, the application processor switches the data transmission path of the another application from the first transmission path to the second transmission path.

Optionally, a menu option of the terminal includes a switching preference setting option, and the switching preference setting option is used by a user to, if a specific application runs on the terminal and when there is a second transmission path corresponding to a wireless fidelity Wi-Fi network, set whether the terminal is allowed to switch the currently used data transmission path from the first transmission path to the second transmission path.

The first condition further includes: the terminal determines, based on the switching preference setting option, that the user allows the terminal to, if a specific application runs on the terminal and when there is a second transmission path corresponding to a wireless fidelity Wi-Fi network, switch the currently used data transmission path from the first transmission path to the second transmission path.

Optionally, the application processor 1101 is further configured to output prompt information by using a small window. The prompt information is used by the user to determine whether to switch the currently used data transmission path from the first transmission path to the second transmission path.

The application processor 1101 is further configured to determine, according to a user indication, to switch the currently used data transmission path from the first transmission path to the second transmission path.

Optionally, the specific application is an online game application and/or a video live broadcast application.

Optionally, the first notification information includes a current status of the mobile network and a current status of the Wi-Fi network.

Optionally, the second notification information includes a current status of the mobile network and a current status of the Wi-Fi network.

Optionally, the first module is a kernel module, and the second module is a connection management module.

It may be understood that, in addition to the application processor 1101, the Wi-Fi communications module 1102, and the memory 1103, the transmission path switching apparatus 110 may further include a transceiver 1104. The transceiver 1104 may be configured to perform data transmission with an external device.

The transmission path switching apparatus 110 provided in this embodiment of this application may be configured to execute the technical solutions of the transmission path switching method embodiments shown in FIG. 2 to FIG. 5. An implementation principle and a technical effect of the transmission path switching apparatus are similar to implementation principles and technical effects in the method embodiments, and details are not described herein again.

Figure 12:
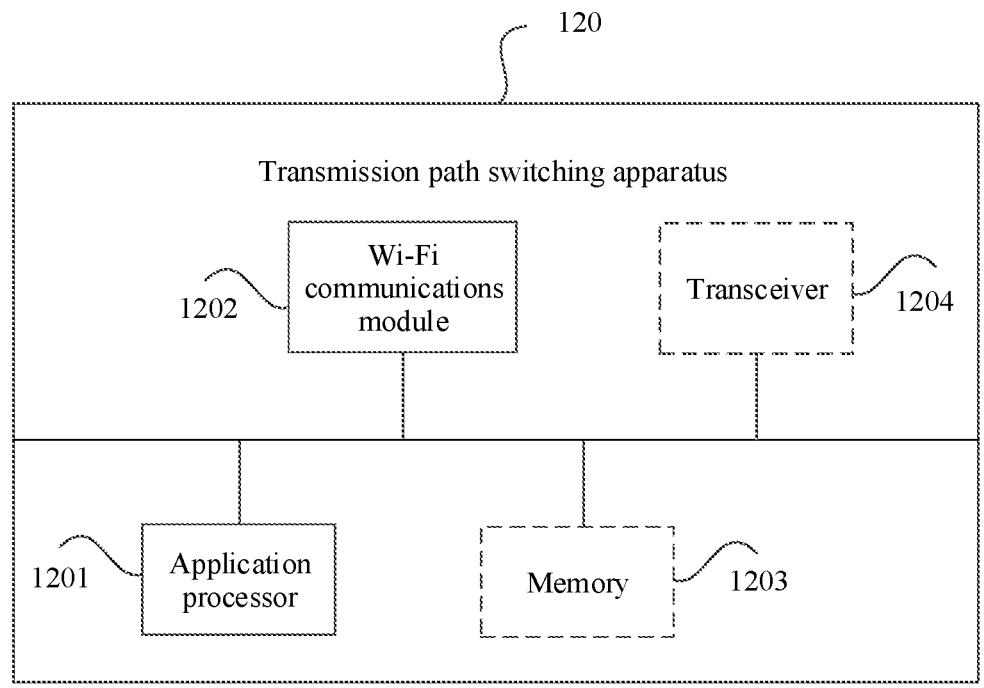
FIG. 12 is a schematic diagram of another transmission path switching apparatus according to an embodiment of this application.

FIG. 12 is a schematic diagram of another transmission path switching apparatus 120 according to an embodiment of this application. The transmission path switching apparatus is applied to a terminal. A data transmission path currently used by the terminal is a first transmission path corresponding to a mobile network. A first TCP connection is established between a specific application and a server corresponding to the specific application, and data of the specific application related to first TCP connection is transmitted by using the first transmission path. The transmission path switching apparatus 120 includes an application processor 1201 and a Wi-Fi communications module 1202.

The application processor 1201 is configured to: after a stored wireless fidelity Wi-Fi network is detected by the Wi-Fi communications module 1202, configure a second transmission path corresponding to the Wi-Fi network; and switch the currently used data transmission path from the first transmission path to the second transmission path when a second TCP connection is being established or has been established between the specific application and the corresponding server, so that data of the specific application related to the second TCP connection is transmitted by using the second transmission path, where the second TCP connection is different from the first TCP connection.

Optionally, the application processor 1201 includes a first module and a second module.

The first module is configured to receive indication information from the second module. The indication information is used to switch the currently used data transmission path from the first transmission path to the second transmission path when the terminal determines that the second TCP connection is being established or has been established between the specific application and the corresponding server.

The first module is configured to switch the currently used data transmission path from the first transmission path to the second transmission path according to the indication information when the second TCP connection is being established or has been established between the specific application and the corresponding server.

Optionally, that the application processor 1201 is configured to switch the currently used data transmission path from the first transmission path to the second transmission path when the second TCP connection is being established or has been established between the specific application and the corresponding server includes:

the application processor 1201 is configured to switch the currently used data transmission path from the first transmission path to the second transmission path when the Wi-Fi network meets a first condition and when the second TCP connection is being established or has been established between the specific application and the corresponding server.

The first condition is related to one or more of the following parameters: signal strength of the Wi-Fi network, signal quality of the Wi-Fi network, duration of the signal strength of the Wi-Fi network, duration of the signal quality of the Wi-Fi network, whether the Wi-Fi network requires secondary authentication, whether data can be transmitted by using the second transmission path, and a rate at which data can be transmitted by using the second transmission path.

Optionally, the application processor 1201 is further configured to determine whether the Wi-Fi network meets the first condition.

That the application processor 1201 is further configured to determine whether the Wi-Fi network meets the first condition includes:

if an application currently running in the foreground on the terminal is a specific application, the application processor 1201 is configured to determine whether the Wi-Fi network meets the first condition.

Optionally, a corresponding first condition when the application currently running in the foreground on the terminal is a non-specific application is different from a corresponding first condition when the application currently running in the foreground on the terminal is a specific application.

Optionally, the first condition includes at least one of the following:

the signal strength of the Wi-Fi network is greater than a first threshold; or the signal strength of the Wi-Fi network is greater than the first threshold, and duration in which the signal strength of the Wi-Fi network is greater than the first threshold is greater than a second threshold; or the signal quality of the Wi-Fi network meets a third condition; or the signal quality of the Wi-Fi network meets a third condition, and duration in which the signal quality of the Wi-Fi network meets the third condition is greater than a third threshold; or the Wi-Fi network does not require secondary authentication; or data can be transmitted by using the second transmission path; or data can be transmitted by using second transmission path, and a transmission rate is greater than a fourth threshold.

Optionally, the application processor 1201 is further configured to determine whether the Wi-Fi network requires secondary authentication.

That the application processor 1201 is configured to configure the second transmission path corresponding to the Wi-Fi network includes:

the application processor 1201 is configured to, if the Wi-Fi network does not require secondary authentication, configure the second transmission path corresponding to the Wi-Fi network.

Optionally, the application processor 1201 is further configured not to, after the stored wireless fidelity Wi-Fi network is detected by the Wi-Fi communications module 1202, and if the Wi-Fi network requires secondary authentication, configure the second transmission path corresponding to the Wi-Fi network.

Optionally, the transmission path switching apparatus 120 further includes a memory 1203.

The memory 1203 is configured to store information about whether the Wi-Fi network requires secondary authentication.

Optionally, the application processor 1201 is further configured to:

send first notification information to the specific application after the second transmission path is configured, where the first notification information is used to notify the specific application that a network status changes; and switch a data transmission path of the specific application from the first transmission path to the second transmission path after the application processor 1201 sends the first notification information to the specific application.

Optionally, that the application processor 1201 switches the data transmission path of the specific application from the first transmission path to the second transmission path after sending the first notification information to the specific application includes:

after the application processor 1201 sends the first notification information to the specific application, and after the specific application sends, by using the first module of the terminal and based on the first notification information, a TCP connection establishment request used to establish the second TCP connection to the server corresponding to the specific application, and the first module of the terminal receives the TCP connection establishment request, the application processor switches the data transmission path of the specific application from the first transmission path to the second transmission path.

Optionally, the application processor 1201 is further configured to:

send second notification information to another application other than the specific application after switching the data transmission path of the specific application from the first transmission path to the second transmission path, where the second notification information is used to notify the another application that a network status changes; and switch a data transmission path of the another application other than the specific application from the first transmission path to the second transmission path after the application processor 1201 sends the second notification information to the another application.

Optionally, that the application processor 1201 switches the data transmission path of the another application other than the specific application from the first transmission path to the second transmission path after sending the second notification information to the another application includes:

after the application processor 1201 sends the second notification information to the another application, and after the another application sends, by using the first module of the terminal and based on the second notification information, a TCP connection establishment request used to establish a Wi-Fi network-based TCP connection to a server corresponding to the another application, and the first module of the terminal receives the TCP connection establishment request, the application processor switches the data transmission path of the another application from the first transmission path to the second transmission path.

Optionally, a menu option of the terminal includes a switching preference setting option, and the switching preference setting option is used by a user to, if a specific application runs on the terminal and when there is a second transmission path corresponding to a wireless fidelity Wi-Fi network, set whether the terminal is allowed to switch the currently used data transmission path from the first transmission path to the second transmission path.

The first condition further includes: the terminal determines, based on the switching preference setting option, that the user allows the terminal to, if a specific application runs on the terminal and when there is a second transmission path corresponding to a wireless fidelity Wi-Fi network, switch the currently used data transmission path from the first transmission path to the second transmission path.

Optionally, the application processor 1201 is further configured to output prompt information by using a small window. The prompt information is used by the user to determine whether to switch the currently used data transmission path from the first transmission path to the second transmission path.

The application processor 1201 is further configured to determine, according to a user indication, to switch the currently used data transmission path from the first transmission path to the second transmission path.

Optionally, the specific application is an online game application and/or a video live broadcast application.

Optionally, the first notification information includes a current status of the mobile network and a current status of the Wi-Fi network.

Optionally, the second notification information includes a current status of the mobile network and a current status of the Wi-Fi network.

Optionally, the first module is a kernel module, and the second module is a connection management module.

It may be understood that, in addition to the application processor 1201, the Wi-Fi communications module 1202, and the memory 1203, the transmission path switching apparatus 120 may further include a transceiver 1204. The transceiver 1204 may be configured to perform data transmission with an external device.

The transmission path switching apparatus 120 provided in this embodiment of this application may be configured to execute the technical solutions of the transmission path switching method embodiments shown in FIG. 2 to FIG. 5. An implementation principle and a technical effect of the transmission path switching apparatus are similar to implementation principles and technical effects in the method embodiments, and details are not described herein again.

Figure 13:
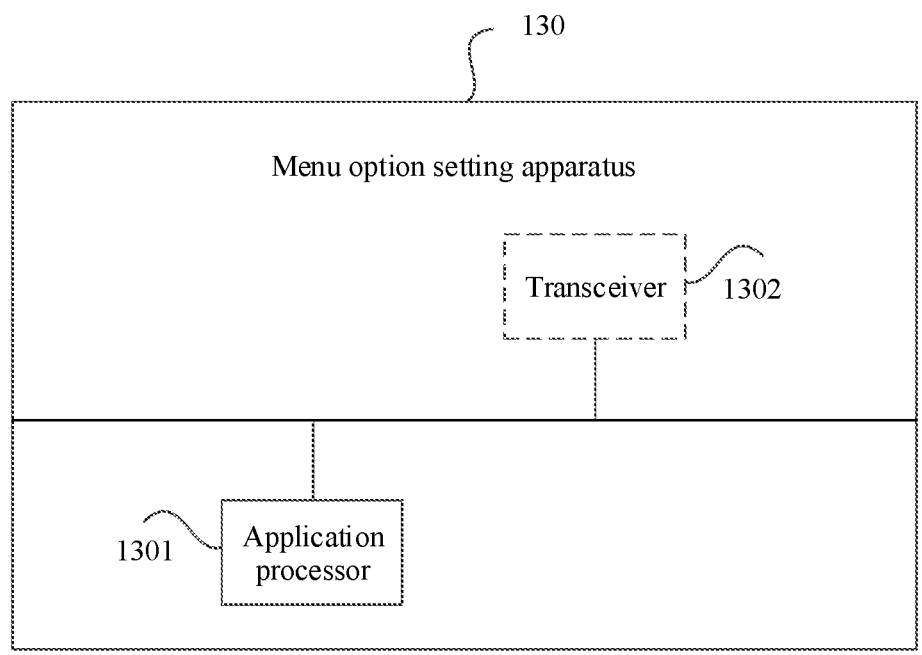
FIG. 13 is a schematic diagram of a structure of another menu option setting apparatus according to an embodiment of this application.

FIG. 13 is a schematic diagram of a structure of a menu option setting apparatus according to an embodiment of this application. The menu option setting apparatus is applied to a terminal. A menu option includes a switching preference setting option. A data transmission path currently used by the terminal is a first transmission path corresponding to a mobile network. For example, referring to FIG. 13, the menu option setting apparatus 130 includes:

an application processor 1301, configured to set the switching preference setting option, where the switching preference setting option is used by a user to, if a specific application runs on the terminal and when there is a second transmission path corresponding to a wireless fidelity Wi-Fi network, set whether the terminal is allowed to switch the currently used data transmission path from the first transmission path to the second transmission path.

Optionally, the switching preference setting option is set in a setting menu option of the terminal, or the switching preference setting option is set in a setting menu option of an assistant application of an application.

Optionally, if the switching preference setting option is set to enabled, and when the terminal has established the second transmission path, the application processor 1301 is further configured to switch the currently used data transmission path from the first transmission path to the second transmission path; or if the switching preference setting option is set to disabled, the application processor does not switch the currently used data transmission path from the first transmission path to the second transmission path.

Optionally, when the switching preference setting option indicates, by using a pop-up window, that there is an available Wi-Fi network, and the user chooses, by using the pop-up window, to perform network switching, the application processor 1301 is further configured to switch the currently used data transmission path from the first transmission path to the second transmission path; and when the switching preference setting option indicates, by using a pop-up window, that there is an available Wi-Fi network, and the user chooses, by using the pop-up window, not to perform network switching, the application processor 1301 does not switch the currently used data transmission path from the first transmission path to the second transmission path.

It may be understood that, in addition to the application processor 1301, the menu option setting apparatus 130 may further include a transceiver 1302. The transceiver 1302 may be configured to perform data transmission with an external device.

The menu option setting apparatus 130 provided in this embodiment of this application may be configured to execute the technical solutions of the menu option setting method embodiments shown in FIG. 2 to FIG. 5. An implementation principle and a technical effect of the setting apparatus are similar to implementation principles and technical effects in the method embodiments, and details are not described herein again.

Figure 14:
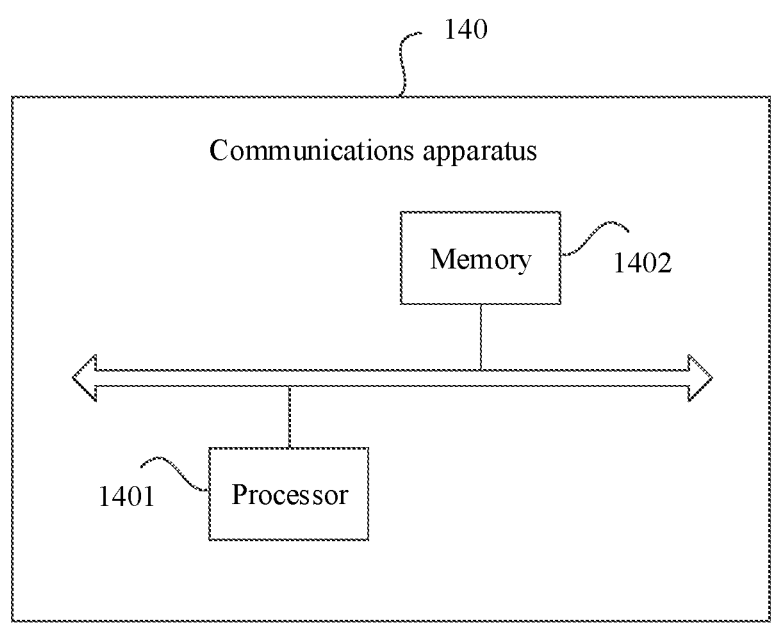
FIG. 14 is a schematic diagram of a structure of a communications apparatus according to an embodiment of this application.

FIG. 14 is a schematic diagram of a structure of a communications apparatus 140 according to an embodiment of this application. For example, referring to FIG. 14, the communications apparatus 140 may include a processor 1401 and a memory 1402.

The memory 1402 is configured to store a program instruction.

The processor 1401 is configured to read the program instruction in the memory 1402, and execute, according to the program instruction in the memory 1402, the technical solutions of the transmission path switching method and/or the menu option setting method in the embodiments shown in FIG. 2 to FIG. 5. An implementation principle and a technical effect of the processor are similar to implementation principles and technical effects in the method embodiments, and details are not described herein again.

An embodiment of this application further provides a computer storage medium, including an instruction. When the instruction is run by one or more processors, a communications apparatus is enabled to execute the technical solutions of the transmission path switching method and/or the menu option setting method in the embodiments shown in FIG. 2 to FIG. 5. An implementation principle and a technical effect of the communications apparatus are similar to implementation principles and technical effects in the method embodiments, and details are not described herein again.

An embodiment of this application provides a program product. The program product includes a computer program.

The computer program is stored in a readable storage medium. At least one processor of a communications apparatus can read the computer program from the readable storage medium. The at least one processor executes the technical solutions of the transmission path switching method and/or the menu option setting method in the embodiments shown in FIG. 2 to FIG. 5. An implementation principle and a technical effect of the processor are similar to implementation principles and technical effects in the method embodiments, and details are not described herein again.

An embodiment of this application further provides a communications apparatus. The communications apparatus may include a processing module. The processing module is configured to perform the transmission path switching method according to the foregoing embodiments, or the processing module is configured to perform the menu option setting method according to the foregoing embodiments. An implementation principle and a technical effect of the communications apparatus are similar to implementation principles and technical effects in the method embodiments, and details are not described herein again.

Optionally, the communications apparatus further includes a storage module. The storage module is configured to store an instruction. The processing module is configured to execute the instruction stored in the storage module, so that the processing module performs the transmission path switching method according to the foregoing embodiments.

Optionally, the communications apparatus is a chip or a chip system.

An embodiment of this application further provides an apparatus, applied to user equipment UE. The apparatus is configured to implement the transmission path switching method according to the foregoing embodiments, or implement the menu option setting method according to the foregoing embodiments. An implementation principle and a technical effect of the apparatus are similar to implementation principles and technical effects in the method embodiments, and details are not described herein again.

It should be noted that, in this embodiment of this application, module division is exemplary, and is merely a logical function division. In actual implementation, another division manner may be used. Functional modules in the embodiments of this application may be integrated into one processing module, or each of the modules may exist alone physically, or two or more modules are integrated into one module. The integrated module may be implemented in a form of hardware, or may be implemented in a form of software functional module.

When the integrated module is implemented in the form of a software functional module and sold or used as an independent product, the integrated unit may be stored in a computer-readable storage medium. Based on such an understanding, the technical solutions of this application essentially, or the part contributing to the prior art, or all or some of the technical solutions may be implemented in a form of software product. The computer software product is stored in a storage medium and includes several instructions for instructing a computer device (which may be a personal computer, a server, a network device, or the like) or a processor to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

All or some of the foregoing embodiments may be implemented by using software, hardware, firmware, or any combination thereof. When software is used to implement the embodiments, the embodiments may be implemented completely or partially in a form of computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like.

What is claimed is:

1. A transmission path switching apparatus wherein a data transmission path currently used by the apparatus is a first transmission path corresponding to a mobile network, wherein a first TCP connection is established between a specific application and a server corresponding to the specific application, and data of the specific application related to the first TCP connection is transmitted using the first transmission path; and the apparatus comprises an application processor and a wireless-fidelity (Wi-Fi) communications module, wherein the application processor comprises a first module and a second module, wherein the application processor is configured to: after a stored Wi-Fi network is detected by the Wi-Fi communications module, configure a second transmission path corresponding to the Wi-Fi network; and when the Wi-Fi network meets a first condition, switch the currently used data transmission path from the first transmission path to the second transmission path, wherein the first condition is related to one or more of the following parameters: a signal strength of the Wi-Fi network, a signal quality of the Wi-Fi network, a duration of the signal strength of the Wi-Fi network, a duration of the signal quality of the Wi-Fi network, whether the Wi-Fi network requires secondary authentication, whether data can be transmitted using the second transmission path, and a rate at which data can be transmitted using the second transmission path and wherein that the application processor is configured to switch the currently used data transmission path from the first transmission path to the second transmission path comprises:

the first module is configured to receive indication information from the second module of the apparatus, wherein the indication information is used to switch the currently used data transmission path from the first transmission path to the second transmission path in response to the apparatus determining that a second TCP connection is being established or has been established between the specific application and the corresponding server, wherein the second TCP connection is different from the first TCP connection; and the application processor is configured to switch the currently used data transmission path from the first transmission path to the second transmission path according to the indication information, so that data of the specific application related to the second TCP connection is transmitted using the second transmission path.

2. The apparatus according to claim 1, wherein the application processor is further configured to determine whether the Wi-Fi network meets the first condition; and that the application processor is further configured to determine whether the Wi-Fi network meets the first condition comprises:

when an application currently running in the foreground on the apparatus is a specific application, the application processor is configured to determine whether the Wi-Fi network meets the first condition.

3. The apparatus according to claim 2, wherein a corresponding first condition when the application currently running in the foreground on the apparatus is a non-specific application is different from a corresponding first condition when the application currently running in the foreground on the apparatus is a specific application.

4. The apparatus according to claim 2 wherein the specific application is an online game application and/or a video live broadcast application.

5. The apparatus according to claim 1, wherein the first condition comprises at least one of the following:
the signal strength of the Wi-Fi network is greater than a first threshold value; or
the signal strength of the Wi-Fi network is greater than the first threshold value, and a duration in which the signal strength of the Wi-Fi network is greater than the first threshold value is greater than a second threshold value; or
the signal quality of the Wi-Fi network meets a third condition; or
the signal quality of the Wi-Fi network meets a third condition, and a duration in which the signal quality of the Wi-Fi network meets the third condition is greater than a third threshold value; or
the Wi-Fi network does not require secondary authentication; or
data can be transmitted using the second transmission path; or
data can be transmitted using the second transmission path, and a transmission rate is greater than a fourth threshold value.

6. The apparatus according to claim 1, wherein the application processor is further configured to determine whether the Wi-Fi network requires secondary authentication; and that the application processor is configured to configure the second transmission path corresponding to the Wi-Fi network comprises:

the application processor is configured to, when the Wi-Fi network does not require secondary authentication, configure the second transmission path corresponding to the Wi-Fi network.

7. The apparatus according to claim 1, wherein the application processor is further configured to send first notification information to the specific application after the second transmission path is configured, wherein the first notification information is used to notify the specific application that a network status changes; and that the application processor is configured to switch the currently used data transmission path from the first transmission path to the second transmission path according to the indication information comprises: the application processor is configured to switch a data transmission path of the specific application from the first transmission path to the second transmission path according to the indication information after the application processor sends the first notification information to the specific application.

8. The apparatus according to claim 7, wherein that the application processor is configured to switch the data transmission path of the specific application from the first transmission path to the second transmission path according to the indication information after sending the first notification information to the specific application comprises:

after the application processor sends the first notification information to the specific application, and after the specific application sends, using the first module of the apparatus and based on the first notification information, a TCP connection establishment request used to establish the second TCP connection to the server corresponding to the specific application, and the first module of the apparatus receives the TCP connection establishment request, the application processor switches the data transmission path of the specific application from the first transmission path to the second transmission path.

9. The apparatus according to claim 7, wherein the application processor is further configured to: send second notification information to another application other than the specific application after switching the data transmission path of the specific application from the first transmission path to the second transmission path, wherein the second notification information is used to notify the another application that a network status changes; and switch a data transmission path of the another application other than the specific application from the first transmission path to the second transmission path after sending the second notification information to the another application.

* * * * *